United States Patent
Murata

(10) Patent No.: US 8,558,926 B2
(45) Date of Patent: Oct. 15, 2013

(54) DISTORTION CORRECTION METHOD, DISTORTION CORRECTION PROGRAM, IMAGE PROCESSING APPARATUS, INTERCHANGEABLE LENS, CAMERA, AND CAMERA SYSTEM

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 1198 days.

(21) Appl. No.: 12/085,550

(22) PCT Filed: Nov. 1, 2006

(86) PCT No.: PCT/JP2006/321906
§ 371 (c)(1),
(2), (4) Date: May 27, 2008

(87) PCT Pub. No.: WO2007/066459
PCT Pub. Date: Jun. 14, 2007

(65) Prior Publication Data
US 2009/0167925 A1      Jul. 2, 2009

(30) Foreign Application Priority Data

Dec. 5, 2005   (JP) .................................. 2005-350985
Mar. 27, 2006  (JP) .................................. 2006-086316

(51) Int. Cl.
*H04N 9/64*   (2006.01)
(52) U.S. Cl.
USPC ......................................................... 348/251
(58) Field of Classification Search
USPC ...................................... 348/222.1, 241, 251
See application file for complete search history.

(56) References Cited

U.S. PATENT DOCUMENTS

| 5,461,440 A * | 10/1995 | Toyoda et al. ................. 396/311 |
| 5,905,530 A | 5/1999 | Yokota et al. |
| 6,323,934 B1 | 11/2001 | Enomoto |
| 6,937,282 B1 | 8/2005 | Some et al. |
| 7,227,574 B2 * | 6/2007 | Yamanaka .................... 348/242 |
| 7,265,787 B2 * | 9/2007 | Takane ......................... 348/335 |
| 2005/0213159 A1 * | 9/2005 | Okada et al. ................. 358/3.26 |

FOREIGN PATENT DOCUMENTS

| EP | 1 505 539 A2 | 2/2005 |
| JP | A-3-242526 | 10/1991 |
| JP | A-06-153065 | 5/1994 |
| JP | A-6-165024 | 6/1994 |

(Continued)

OTHER PUBLICATIONS

Yuto Takahashi, "Lens Designing," Tokai University Press, p. 127, Mar. 20, 1994, partial translation.

(Continued)

*Primary Examiner* — Nicholas Giles
(74) *Attorney, Agent, or Firm* — Oliff & Berridge, PLC

(57) ABSTRACT

In a distortion correcting method for an image taken by an optical system, the invention makes it possible to increase the calculation accuracy of distortion of an image while reducing the amount of information to be prepared in advance. To this end, approximation information that is obtained when distortion aberration (A) of the optical system is approximated by a function ($S_A$: A(f, d)) of a shooting condition (d, f) that is set in the optical system is prepared in advance, and distortion of an image taken by the optical system is calculated based on the shooting condition that was set when the image was taken and the approximation information prepared in advance. Though being small in information amount, this approximation information makes it possible to calculate distortion aberration under every shooting condition.

26 Claims, 11 Drawing Sheets

(56) References Cited

FOREIGN PATENT DOCUMENTS

| JP | A-6-250277 | 9/1994 |
| JP | A-2000-125175 | 4/2000 |
| JP | A-2003-50990 | 2/2003 |
| JP | A-2003-069889 | 3/2003 |
| JP | A-2003-110847 | 4/2003 |

OTHER PUBLICATIONS

Japanese Office Action issued in Application No. 2007-549038 dated May 31, 2011 (w/ English Translation).

Dec. 6, 2011 Supplemental Search Report issued in European Application No. 06822826.1.

* cited by examiner $D \equiv Ar^4 + Br^3 + Cr^2$ (IMAGE HEIGHT)/(MAXIMUM IMAGE HEIGHT)
r

| d \ f | f1 | f2 | f3 |
|---|---|---|---|
| d1 | A11,B11,C11 | A12,B12,C12 | A13,B13,C13 |
| d2 | A21,B21,C21 | A22,B22,C22 | A23,B23,C23 |
| d3 | A31,B31,C31 | A32,B32,C32 | A33,B33,C33 |

COEFFICIENTS A

| d \ f | f1 | f2 | f3 |
|---|---|---|---|
| d1 | A11 | A12 | A13 | ► LA:A(f) |
| d2 | A21 | A22 | A23 |
| d3 | A31 | A32 | A33 |

LA:A(d)

COEFFICIENTS B

| d \ f | f1 | f2 | f3 |
|---|---|---|---|
| d1 | B11 | B12 | B13 | ► LB:B(f) |
| d2 | B21 | B22 | B23 |
| d3 | A31 | A32 | A33 |

LB:B(d)

Fig.6
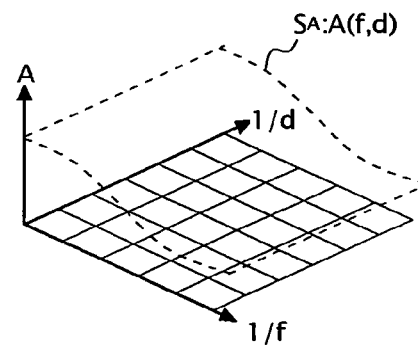
Fig.7
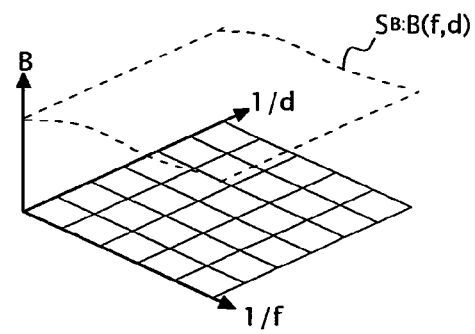
Fig.8
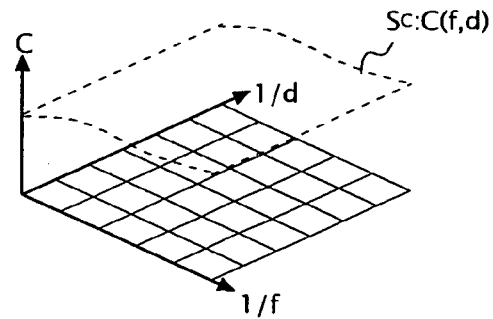
Fig.9

Fig.20

| LENS TYPE | FUNCTION TYPE | DISTORTION CORRECTING INFORMATION COEFFICIENTS |
|---|---|---|
| 1 | 13 | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 2 | 13 | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| 3 | 14 | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$ |
| 4 | 13 | $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}$  $\Delta_{00}, \Delta_{01}, \Delta_{02}, \Delta_{10}, \Delta_{11}, \Delta_{12}, \Delta_{20}, \Delta_{21}, \Delta_{22}$  $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}$ |
| ... | ... | ... |

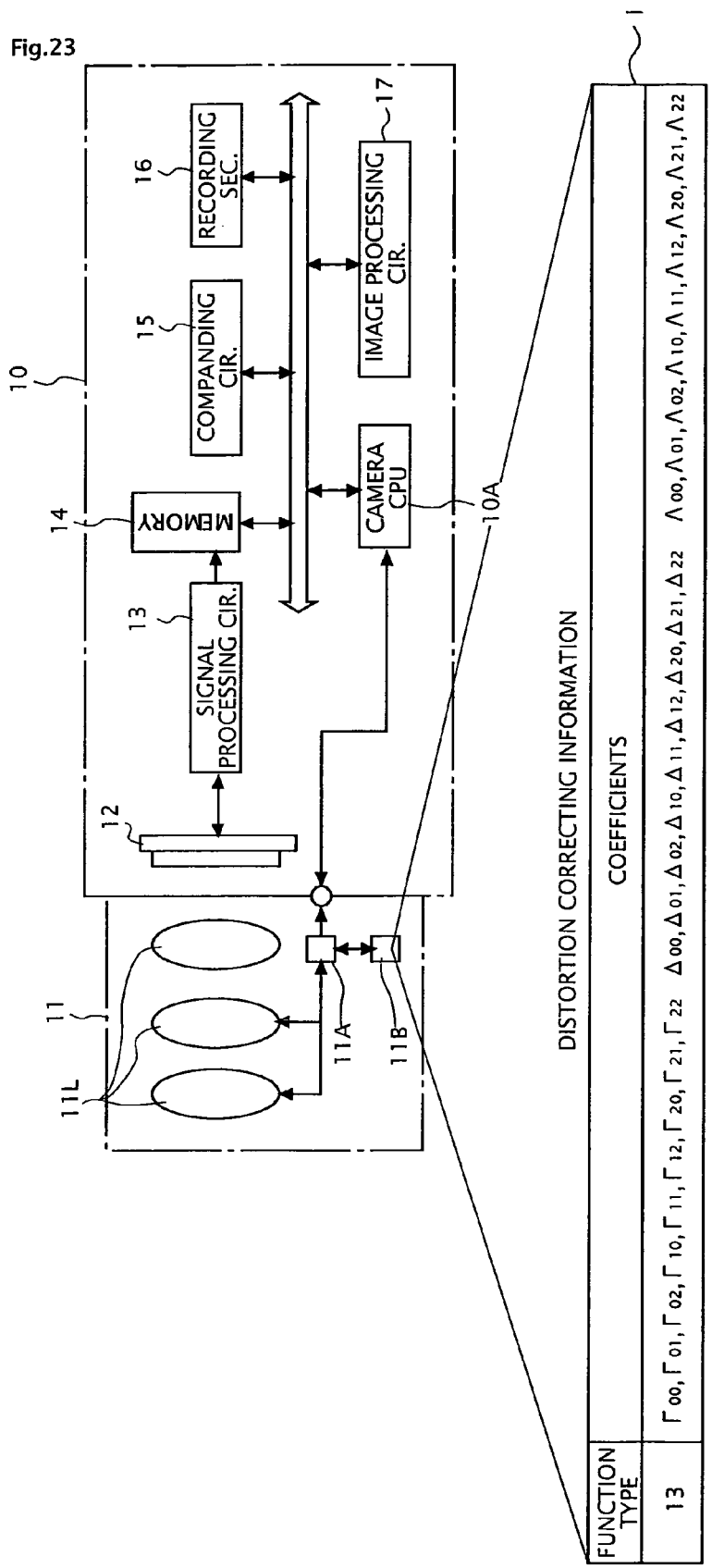

DISTORTION CORRECTION METHOD, DISTORTION CORRECTION PROGRAM, IMAGE PROCESSING APPARATUS, INTERCHANGEABLE LENS, CAMERA, AND CAMERA SYSTEM

CROSS-REFERENCE TO RELATED APPLICATION

This application is a U.S. National Stage application claiming the benefit of prior filed International Application Number PCT/JP2006/321906, filed Nov. 1, 2006, in which the International Application claims priorities from Japanese Application Numbers 2005-350985 (filed on Dec. 5, 2005) and 2006-086316 (filed on Mar. 27, 2006), the entire contents of which are incorporated herein by reference.

TECHNICAL FIELD

The present invention relates to a distortion correcting method and a distortion correcting program which are applied to an electronic camera, image processing software, etc. The invention also relates to a camera such as an electronic camera, an image processing apparatus which is applied to an electronic camera etc., an interchangeable lens, and a camera system.

BACKGROUND ART

Image processing techniques for correcting distortion of an image taken by an electronic camera or the like are known (refer to Patent Document 1 and Non-patent Document 1, for example). In such distortion correction, it is necessary that a distortion amount distribution in an image be known.

A distortion amount D that is caused in an image by an imaging lens is given, where Y is the image height of an ideal image point and $Y_0$ is the image height of an actual image point, by the following equation:

$$D = 100 \times (Y - Y_0)/Y_0 (\%)$$

The distribution of the distortion amount D in an image is a function of the image height ratio r (=(image height)/(maximum image height)) and can be approximated as follows:

$$D(r) = a_1 r + a_2 r^2 + a_3 r^3 + a_4 r^4 + a_5 r^5 + a_6 r^6 + \ldots$$

In many cases, a good enough approximation can be obtained even if the order is reduced to 3 in the following manner:

$$D(r) = a_1 r + a_2 r^2 + a_3 r^3$$

The coefficients (hereinafter referred to as distortion coefficients) $a_1$, $a_2$, and $a_3$ of this function which represents the distortion amount distribution vary depending on not only the lens type (specification) but also the lens position (combination of the focal length f and the focal position d) at the time of shooting.

For the above reason, in the camera disclosed in Patent Document 1, a table containing distortion coefficients $a_1$, $a_2$, and $a_3$ for each lens position is prepared in advance as the distortion correcting information. In taking an image, the camera can easily calculate a distortion amount distribution in the image by referring to this table based on a lens position.
Patent Document 1: Japanese Unexamined Patent Application Publication No. 2003-110847
Non-patent Document 1: Yuto Takahashi, "Lens Designing," Tokai University Press, p. 127, Mar. 20, 1994.

DISCLOSURE

Problems to be Solved

In such a camera, the correction accuracy can be increased by setting the lens position steps finer or increasing the order of the function that represents the distortion amount distribution. However, this renders the information amount of the table enormous. Furthermore, the allowable information amount of the table and the desired correction accuracy vary depending on the specification etc. of the camera.

A proposition of the present invention is therefore to provide a distortion correcting method, a distortion correcting program, and an image processing apparatus capable of increasing the calculation accuracy of distortion of an image while reducing the amount of information to be prepared in advance. Another proposition of the invention is to provide an interchangeable lens, a camera, and a camera system which are suitable to realize such a distortion correcting method.

A further proposition of the invention is to provide a distortion correcting method, a distortion correcting program, a camera, an interchangeable lens, and a camera system which make it possible to perform satisfactory distortion correction in a reliable manner.

Means for Solving the Problems

The present invention provides a distortion correcting method for an image taken by an optical system, including the operations of preparing, in advance, approximation information that is obtained when distortion aberration of the optical system is approximated by a function of a shooting condition that is set in the optical system, and calculating distortion of an image taken by the optical system based on the shooting condition that was set when the image was taken and the approximation information prepared in advance.

It is desirable that the shooting condition be at least one of a focal position and a focal length of the optical system.

It is desirable that the approximation information be approximation information that is obtained when each of one or more coefficients of a function of a position in the image that represents the distortion aberration is approximated by a power function of at least one of the focal position and the focal length.

It is desirable that the approximation information be made up of coefficients of respective terms of the power function.

It is desirable that the power function include a term of raising to an inverse power of the focal position.

It is desirable that the power function include a term of raising to an inverse power of the focal length.

Furthermore, it is desirable that the power function include a term of a multiple root of the focal length.

A distortion correcting program according to the invention causes a computer to execute any of the distortion correcting methods according to the invention.

An image processing apparatus according to the invention includes units which execute any of the distortion correcting methods according to the invention.

An interchangeable lens according to the invention includes approximation information that is obtained when distortion aberration of an optical system is approximated by a function of a shooting condition that is set in the optical system is stored therein in advance.

It is desirable that the shooting condition be at least one of a focal position and a focal length of the optical system.

It is desirable that the approximation information be approximation information that is obtained when each of one or more coefficients of a function of a position in the image that represents the distortion aberration is approximated by a power function of at least one of the focal position and the focal length.

It is desirable that the approximation information be made up of coefficients of respective terms of the power function.

It is desirable that the power function include a term of raising to an inverse power of the focal position.

It is desirable that the power function include a term of raising to an inverse power of the focal length.

It is desirable that the power function include a term of a multiple root of the focal length.

A camera system according to the invention including any of the interchangeable lenses according to the invention; and a camera capable of reading the approximation information stored in the interchangeable lens in advance.

It is desirable that the camera comprise a unit which calculates distortion of an image taken by the optical system of the interchangeable lens based on a shooting condition of the optical system that was set when the image was taken and the read-out approximation information.

It is desirable that the camera comprise a unit which performs distortion correction on the image according to the calculated distortion.

It is desirable that the camera comprise a unit which adds information representing the calculated distortion to the image.

Furthermore, it is desirable that the camera comprise a unit which adds the read-out approximation information to an image taken by the optical system of the interchangeable lens.

A camera according to the invention includes approximation information that is obtained when distortion aberration of an optical system is approximated by a function of a shooting condition that is set in the optical system is stored therein in advance.

It is desirable that the shooting condition be at least one of a focal position and a focal length of the optical system.

It is desirable that the approximation information be approximation information that is obtained when each of one or more coefficients of a function of a position in the image that represents the distortion aberration is approximated by a power function of at least one of the focal position and the focal length.

It is desirable that the approximation information be made up of coefficients of respective terms of the power function.

It is desirable that the power function include a term of raising to an inverse power of the focal position.

It is desirable that the power function include a term of raising to an inverse power of the focal length.

Furthermore, it is desirable that the power function include a term of a multiple root of the focal length.

The invention provides a distortion correcting method including the operations of preparing, in advance, distortion information that is obtained by expressing distortion aberration of an imaging optical system in the form of a function of a position on an image surface, calculating distortion amounts of an image taken by the optical system using the distortion information prepared in advance, and performing distortion correction on the image based on the calculated distortion amounts, in which a combination of the number of terms of the function and the number of orders of respective terms of the function are determined according to at least one of desired accuracy of the distortion correction and an allowable information amount of the distortion information.

It is desirable that one choice of the function be a function $D(r)$ which represents a distortion amount D by at least a fourth-order term of r, a third-order term of r, and a second-order term of r, where r is a ratio of an image height to a maximum image height of the optical system.

It is desirable that one choice of the function be a function $D(r)$ which represents a distortion amount D only by second and higher order terms of r, where r is a ratio of an image height to a maximum image height of the optical system.

It is desirable that the number of terms of r included in the function $D(r)$ be four or less.

It is desirable that one choice of the function be a function $D(r)$ which represents a distortion amount D by an equation $D(r) \equiv Ar^4 + Br^3 + Cr^2$ (A, B, and C are coefficients), where r is a ratio of an image height to a maximum image height of the optical system.

Furthermore, it is desirable that one choice of the function be a function $D(r)$ which represents a distortion amount D by an equation $D(r) \equiv Ar^3 + Br^2$ (A and B are coefficients), where r is a ratio of an image height to a maximum image height of the optical system.

A distortion correcting program according to the invention causes a computer to execute the operations of preparing, in advance, distortion information that is obtained by expressing distortion aberration of an imaging optical system in the form of a function of a position on an image surface, calculating distortion amounts of an image taken by the optical system using the distortion information stored in advance; and performing distortion correction on the image based on the calculated distortion amounts, the distortion correcting program further including pieces of distortion information are prepared for respective types of optical systems, and that a combination of the number of terms of the function and the number of orders of respective terms of the function are determined in advance for each of the types of optical systems.

It is desirable that the function of at least one of the types of optical systems be a function $D(r)$ which represents a distortion amount D by at least a fourth-order term of r, a third-order term of r, and a second-order term of r, where r is a ratio of an image height to a maximum image height of the optical system.

It is desirable that the function of at least one of the types of optical systems be a function $D(r)$ which represents a distortion amount D only by second and higher order terms of r, where r is a ratio of an image height to a maximum image height of the optical system.

It is desirable that the number of terms of r included in the function $D(r)$ be four or less.

It is desirable that the function of at least one of the types of optical systems be a function $D(r)$ which represents a distortion amount D by an equation $D(r) \equiv Ar^4 + Br^3 + Cr^2$ (A, B, and C are coefficients), where r is a ratio of an image height to a maximum image height of the optical system.

Furthermore, it is desirable that the function of at least one of the types of optical systems be a function $D(r)$ which represents a distortion amount D by an equation $D(r) \equiv Ar^3 + Br^2$ (A and B are coefficients), where r is a ratio of an image height to a maximum image height of the optical system.

A camera according to the invention includes distortion information that is obtained by expressing distortion aberration of an imaging optical system in the form of a function of a position on an image surface is stored therein in advance, and that the function is a function $D(r)$ which represents a distortion amount D only by second and higher order terms of r, where r is a ratio of an image height to a maximum image height of the optical system.

It is desirable that the number of terms of r included in the function $D(r)$ be four or less.

It is desirable that the function be a function D(r) which represents a distortion amount D by an equation $D(r) \equiv Ar^4 + Br^3 + Cr^2$ (A, B, and C are coefficients), where r is a ratio of an image height to a maximum image height of the optical system.

It is desirable that the function be a function D(r) which represents a distortion amount D by an equation $D(r) \equiv Ar^3 + Br^2$ (A and B are coefficients), where r is a ratio of an image height to a maximum image height of the optical system.

An interchangeable lens according to the invention includes distortion information that is obtained by expressing distortion aberration of an imaging optical system in the form of a function of a position on an image surface is stored therein in advance, and the function is a function D(r) which represents a distortion amount D only by second and higher order terms of r, where r is a ratio of an image height to a maximum image height of the optical system.

It is desirable that the number of terms of r included in the function D(r) be four or less.

It is desirable that the function be a function D(r) which represents a distortion amount D by an equation $D(r) \equiv Ar^4 + Br^3 + Cr^2$ (A, B, and C are coefficients), where r is a ratio of an image height to a maximum image height of the optical system.

Furthermore, it is desirable that the function be a function D(r) which represents a distortion amount D by an equation $D(r) \equiv Ar^3 + Br^2$ (A and B are coefficients), where r is a ratio of an image height to a maximum image height of the optical system.

A camera system according to the invention includes a camera capable of reading the distortion information stored in the interchangeable lens in advance.

Advantages of the Invention

The invention realizes a distortion correcting method, a distortion correcting program, and an image processing apparatus capable of increasing the calculation accuracy of distortion of an image while reducing the amount of information to be prepared in advance. The invention also realizes an interchangeable lens, a camera, and a camera system which are suitable to realize them.

Furthermore, the invention realizes a distortion correcting method, a distortion correcting program, a camera, an interchangeable lens, and a camera system which make it possible to perform satisfactory distortion correction in a reliable manner.

BRIEF DESCRIPTION OF THE DRAWINGS

FIG. 6 shows the data of the distortion coefficient C.

FIG. 7 shows the concept of an approximation curved surface $S_A$.

FIG. 8 shows the concept of an approximation curved surface $S_B$.

FIG. 9 shows the concept of an approximation curved surface $S_C$.

FIG. 20 illustrates the contents of a table stored in a computer.

FIG. 23 shows the configuration of a camera system according to a seventh embodiment.

DETAILED DESCRIPTION OF THE EMBODIMENTS

Embodiment 1

A first embodiment of the present invention will be described below. This embodiment is directed to a camera system.

First, the configuration of this camera system will be described.

Figure 1:
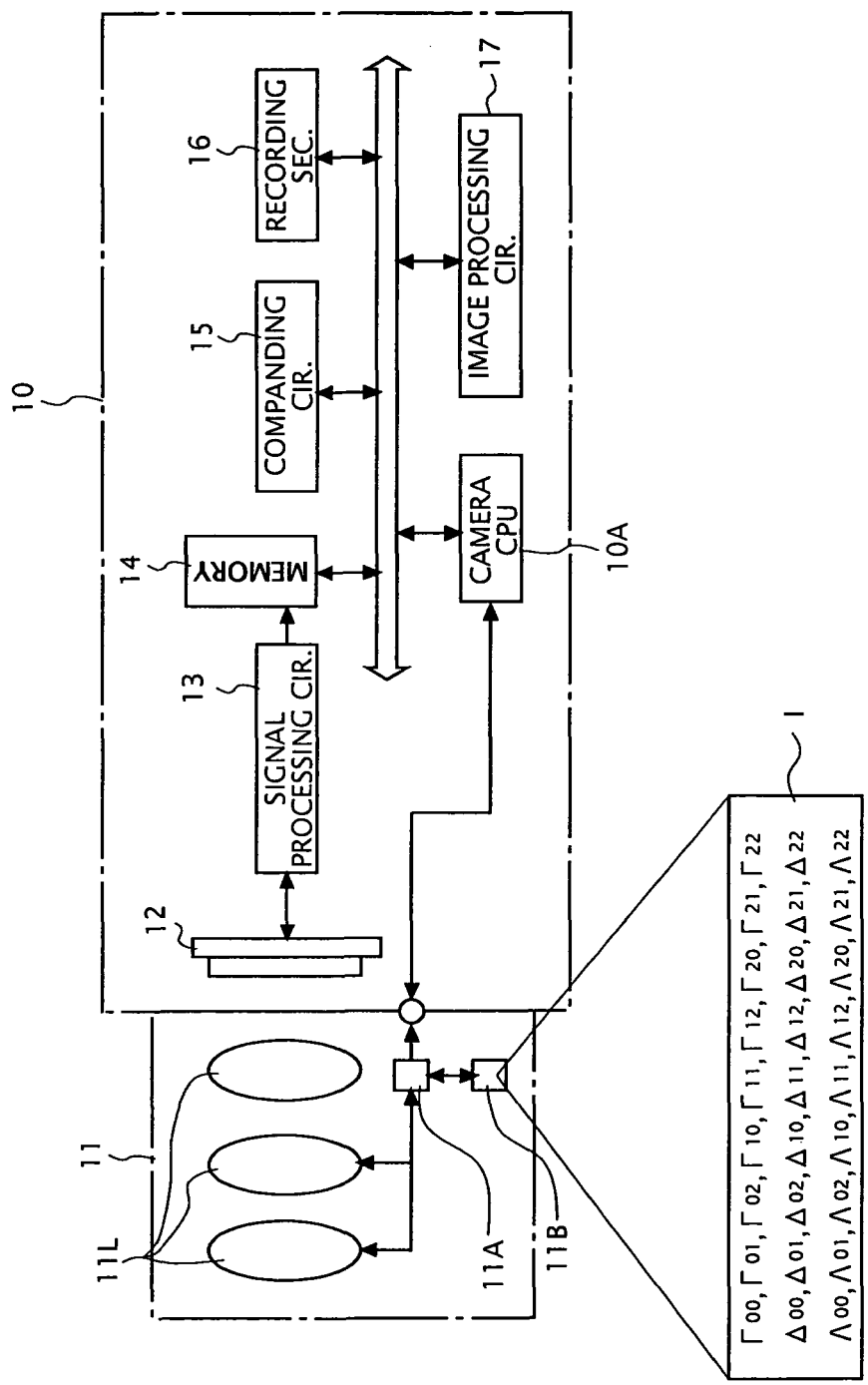
FIG. 1 shows the configuration of a camera system according to a first embodiment.

FIG. 1 shows the configuration of this camera system. As shown in FIG. 1, the camera system is made up of an interchangeable lens 11 and a camera body 10.

The interchangeable lens 11 is equipped with a zoom lens 11L whose focal position and focal length are variable, a lens CPU 11A, a ROM 11B, etc. The camera body 10 is equipped with a camera CPU 10A, an imaging sensor 12, a signal processing circuit 13, a memory 14, a companding circuit 15, a recording section 16, an image processing circuit 17, etc.

At the time of shooting, the zoom lens 11L of the interchangeable lens 11 forms an object image on the imaging sensor 12 of the camera body 10. The imaging sensor 12 acquires an image by imaging the object image. The image is processed in the image processing circuit 13 and then stored in the memory 14 temporarily. The image processing circuit 17 performs image processing on the image, and a corrected image is compressed in the companding circuit 15 and recorded in the recording section 16.

Information obtained when a distortion amount distribution to be caused by the zoom lens 11L in an image was approximated by a function of the lens position (focal position and focal length) of the zoom lens 11L is stored in the ROM 11B of the interchangeable lens 11 as distortion correcting information I. The distortion correcting information I is information that was generated in advance by a manufacturer of the interchangeable lens 11 based on design data and measured data of the zoom lens 11L. The details of the distortion correcting information I will be described later.

The CPU 11A of the interchangeable lens 11 reads the distortion correcting information I from the ROM 11B with proper timing (e.g., at application of power) and sends it to the camera CPU 10A of the camera body 10. In taking an image, the lens CPU 11A reads, via an encoder (not shown), a lens position (a combination of a focal position and a focal length) that is set for the zoom lens 11L and sends the lens position information to the camera CPU 10A of the camera body 10. The distortion correcting information I and the lens position information that are received by the camera CPU 10A are used for the above-mentioned image processing if necessary. In particular, in this embodiment, distortion correction processing is performed on using the distortion correcting information I and the lens position information when the camera body 10 is set to a distortion correcting mode. The details of the distortion correction processing will be described later.

Next, the distortion correcting information I will be described in detail.

Figures 2, 3, 4, 5:
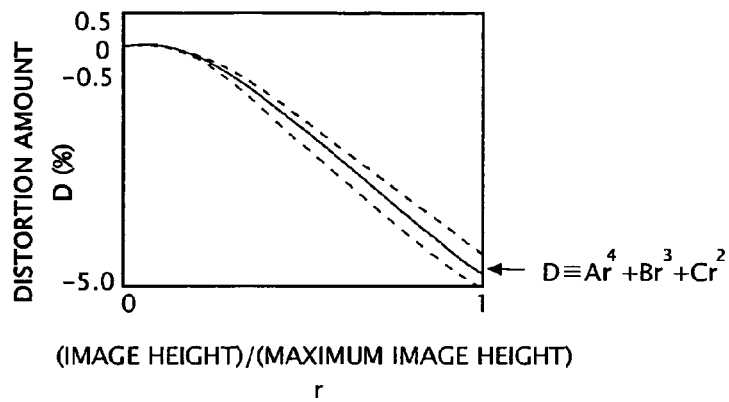
FIG. 2 shows an example of distortion aberration data (i.e., a distortion amount distribution to occur in an image) in a state that a zoom lens 11L has a certain lens position.
FIG. 3 shows data of distortion coefficients A, B, and C.
FIG. 4 shows the data of the distortion coefficient A.
FIG. 5 shows the data of the distortion coefficient B.

FIG. 2 shows an example of distortion aberration data (i.e., a distortion amount distribution to occur in an image) in a state that the zoom lens 11L has a certain lens position. The horizontal axis and the vertical axis of FIG. 2 represent the image height ratio r and the distortion amount D, respectively. The distortion amount D is expressed as a function of the image height ratio r in the following manner:

$$D \equiv Ar^4 + Br^3 + Cr^2 \quad (1)$$

When the lens position (the combination of the focal position d and the focal length f) of the zoon lens 11L is varied, the distortion amount distribution varies as indicated by broken lines in FIG. 2, for example, and a combination of the distortion coefficients A, B, and C in the function (1) also vary.

Therefore, the manufacturer acquires data of plural combinations of distortion coefficients A, B, and C by conducting a simulation using design data of the zoom lens 11L or an experiment using the zoom lens 11L in which the lens position (the combination of the focal position d and the focal length f) of the zoon lens 11L is varied so as to take plural positions. For the sake of simplicity, a case that nine data are obtained by varying the focal position d and the focal length f so that they take three values each will be described here.

FIG. 3 shows nine data of the distortion coefficients A, B, and C that corresponding to respective combinations of a focal position d and a focal length f. FIGS. 4, 5, and 6 separately show the data of the distortion coefficient A, the data of the distortion coefficient B, and the data of the distortion coefficient C, respectively.

For example, one can recognize how the distortion coefficient A varies with the focal position d when the focal length f is fixed at $f_1$ by referring to the data $A_{11}, A_{21}$, and $A_{31}$ of the distortion coefficient A that correspond to the focal length $f=f_1$ in FIG. 4. A distribution of the distortion coefficient A in the d direction at the focal length $f=f_1$ can be approximated by a curve by using the data $A_{11}, A_{21}$, and $A_{31}$. For example, the approximation curve $L_A$ is given by a power function (1Ad) of the focal position d:

[Formula 1]

$$A(d) \equiv \alpha_0 + \alpha_1 \frac{1}{d} + \alpha_2 \left(\frac{1}{d}\right)^2 \equiv \sum_{i=0}^{2} \alpha_i d^{-i} \quad (1Ad)$$

This power function (1Ad) is made up of three terms, that is, the term of the focal position d raised to the 0th power, the term of the focal position d raised to the (−1)th power, and the term of the focal position d raised to the (−2)th power. In this manner, by using terms of d raised to inverse powers, a distribution of the distortion coefficient A in the d direction can be approximated by a small number of terms with high accuracy. Other power functions can be used instead of the power function (1Ad), as described later.

For example, one can recognize how the distortion coefficient A varies with the focal length f when the focal position d is fixed at $d_1$ by referring to the data $A_{11}, A_{12}$, and $A_{13}$ of the distortion coefficient A that correspond to the focal position $d=d_1$ in FIG. 4. A distribution of the distortion coefficient A in the f direction at the focal position $d=d_1$ can be approximated by a curve by using the data $A_{11}, A_{21}$, and $A_{13}$. For example, the approximation curve $L_A$ is given by a power function (1Af) of the focal length f:

[Formula 2]

$$A(f) \equiv \lambda_0 + \lambda_1 \frac{1}{f} + \lambda_2 \left(\frac{1}{f}\right)^2 \equiv \sum_{j=0}^{2} \lambda_j f^{-j} \quad (1Af)$$

This power function (1Af) is made up of three terms, that is, the term of the focal length f raised to the 0th power, the term of the focal length f raised to the (−1)th power, and the term of the focal length f raised to the (−2)th power. In this manner, by using terms of f raised to inverse powers, a distribution of the distortion coefficient A in the f direction can be approximated by a small number of terms with high accuracy. Other power functions can be used instead of the power function (1Af), as described later.

Likewise, a distribution of the distortion coefficient B in the d direction at the focal length $f=f_1$ can be approximated by a curve by using the three data $B_{11}, B_{21}$, and $B_{31}$ of the distortion coefficient B shown in FIG. 5. For example, the approximation curve $L_B$ is given by the following power function (1Bd) of d:

[Formula 3]

$$B(d) \equiv \beta_0 + \beta_1 \frac{1}{d} + \beta_2 \left(\frac{1}{d}\right)^2 \equiv \sum_{i=0}^{2} \beta_i d^{-i} \quad (1Bd)$$

A distribution of the distortion coefficient B in the f direction at the focal position $d=d_1$ can be approximated by a curve by using the three data $B_{11}, B_{12}$, and $B_{13}$ of the distortion coefficient B shown in FIG. 5. For example, the approximation curve $L_B$ is given by the following power function (1Bf) of f:

[Formula 4]

$$B(f) \equiv \mu_0 + \mu_1 \frac{1}{f} + \mu_2 \left(\frac{1}{f}\right)^2 \equiv \sum_{j=0}^{2} \mu_j f^{-j} \quad (1Bf)$$

Likewise, a distribution of the distortion coefficient C in the d direction at the focal length $f=f_1$ can be approximated by a curve by using the three data $C_{11}$, $C_{21}$, and $C_{31}$ of the distortion coefficient C shown in FIG. 6. For example, the approximation curve $L_C$ is given by the following power function (1Cd) of d:

[Formula 5]

$$C(d) \equiv \gamma_0 + \gamma_1 \frac{1}{d} + \gamma_2 \left(\frac{1}{d}\right)^2 \equiv \sum_{i=0}^{2} \gamma_i d^{-i} \quad (1Cd)$$

A distribution of the distortion coefficient C in the f direction at the focal position $d=d_1$ can be approximated by a curve by using the three data $C_{11}$, $C_{12}$, and $C_{13}$ of the distortion coefficient C shown in FIG. 6. For example, the approximation curve $L_C$ is given by the following power function (1Cf) of f:

[Formula 6]

$$C(f) \equiv \nu_0 + \nu_1 \frac{1}{f} + \nu_2 \left(\frac{1}{f}\right)^2 \equiv \sum_{j=0}^{2} \nu_j f^{-j} \quad (1Cf)$$

An extension of the above discussion leads to the following.

As shown in FIG. 7, the distribution of the distortion coefficient A in the d and f directions can be approximated by a curved surface by using the nine data $A_{11}, A_{12}, \ldots, A_{33}$ of the distortion coefficient A shown in FIG. 4 (in FIG. 7, the 1/d axis and the 1/f axis are used instead of the d axis and the f axis). For example, the approximation surface $S_A$ is given by the following power function (1A) of d and f:

[Formula 7]

$$A(f, d) \equiv \sum_{i=0}^{2} \sum_{j=0}^{2} \Gamma_{ij} d^{-i} f^{-i} \quad (1A)$$

This power function (1A) is a power function that is obtained by expanding the distortion coefficient A into a power series of the focal position d and the focal length f and that is made up of nine terms obtained by combining the above-described power functions (1Ad) and (1Af).

Likewise, as shown in FIG. 8, the distribution of the distortion coefficient B in the d and f directions can be approximated by a curved surface by using the nine data $B_{11}, B_{12}, \ldots, B_{33}$ of the distortion coefficient B shown in FIG. 5 (in FIG. 8, the 1/d axis and the 1/f axis are used instead of the d axis and the f axis). For example, the approximation surface $S_B$ is given by the following power function (1B) of d and f:

[Formula 8]

$$B(f, d) \equiv \sum_{i=0}^{2} \sum_{j=0}^{2} \Delta_{ij} d^{-i} f^{-i} \quad (1B)$$

This power function (1B) is made up of nine terms obtained by combining the above-described power functions (1Bd) and (1Bf).

Likewise, as shown in FIG. 9, the distribution of the distortion coefficient C in the d and f directions can be approximated by a curved surface by using the nine data $C_{11}$, $C_{12}, \ldots, C_{33}$ of the distortion coefficient C shown in FIG. 6 (in FIG. 9, the 1/d axis and the 1/f axis are used instead of the d axis and the f axis). For example, the approximation surface $S_C$ is given by the following power function (1C) of d and f:

[Formula 9]

$$C(f, d) \equiv \sum_{i=0}^{2} \sum_{j=0}^{2} \Lambda_{ij} d^{-i} f^{-i} \quad (1C)$$

This power function (1B) is made up of nine terms obtained by combining the above-described power functions (1Cd) and (1Cf).

The manufacturer calculates an approximation curved surface $S_A$ (see FIG. 7) of the distortion coefficient A based on the nine data $A_{11}, A_{12}, \ldots, A_{33}$ (see FIG. 4) of the distortion coefficient A. That is, the manufacturer determines values of the nine coefficients (hereinafter referred to as approximation coefficients) $\Gamma_{00}, \Gamma_{01}, \Gamma_{02}, \Gamma_{10}, \Gamma_{11}, \Gamma_{12}, \Gamma_{20}, \Gamma_{21}$, and $\Gamma_{22}$ in the power function (1A) by fitting the power function (1A) to represent the approximation curved surface $S_A$ to the nine data $A_{11}, A_{12}, \ldots, A_{33}$ of the distortion coefficient A.

Since the number of data of the distortion coefficient A is equal to the number of approximation coefficients $\Gamma$ to be determined, in the fitting, nine equations are produced by substituting the data $A_{11}, A_{12}, \ldots, A_{33}$ into the power function (1A) and values of the nine approximation coefficients $\Gamma_{00}$, $\Gamma_{01}, \Gamma_{02}, \Gamma_{10}, \Gamma_{11}, \Gamma_{12}, \Gamma_{20}, \Gamma_{21}$, and $\Gamma_{22}$ are determined from the nine equations as simultaneous equations. One method for increasing the fitting accuracy is to increase the number of data of the distortion coefficient A to 10 or more and perform fitting by the least-squares method.

Likewise, the manufacturer calculates an approximation curved surface $S_B$ (see FIG. 8) of the distortion coefficient B based on the nine data $B_{11}, B_{12}, \ldots, B_{33}$ (see FIG. 5) of the distortion coefficient B. That is, the manufacturer determines values of the nine approximation coefficients $\Delta_{00}, \Delta_{01}, \Delta_{02}$, $\Delta_{10}, \Delta_{11}, \Delta_{12}, \Delta_{20}, \Delta_{21}$, and $\Delta_{22}$ in the power function (1B) by fitting the power function (1B) to represent the approximation curved surface $S_B$ to the nine data $B_{11}, B_{12}, \ldots, B_{33}$ of the distortion coefficient B.

Since the number of data of the distortion coefficient B is equal to the number of approximation coefficients $\Delta$ to be determined, in the fitting, nine equations are produced by substituting the data $B_{11}, B_{12}, \ldots, B_{33}$ into the power function (1B) and values of the nine approximation coefficients $\Delta_{00}$, $\Delta_{01}, \Delta_{02}, \Delta_{10}, \Delta_{11}, \Delta_{12}, \Delta_{20}, \Delta_{21}$, and $\Delta_{22}$ are determined from the nine equations as simultaneous equations. One method for increasing the fitting accuracy is to increase the number of data of the distortion coefficient B to 10 or more and perform fitting by the least-squares method.

Likewise, the manufacturer calculates an approximation curved surface $S_C$ (see FIG. 9) of the distortion coefficient C based on the nine data $C_{11}, C_{12}, \ldots, C_{33}$ (see FIG. 6) of the distortion coefficient C. That is, the manufacturer determines values of the nine approximation coefficients $\Lambda_{00}, \Lambda_{01}, \Lambda_{02}, \Lambda_{10}, \Lambda_{11}, \Lambda_{12}, \Lambda_{20}, \Lambda_{21}$, and $\Lambda_{22}$ in the power function (1C) by fitting the power function (1C) to represent the approximation curved surface $S_C$ to the nine data $C_{11}, C_{12}, \ldots, C_{33}$ of the distortion coefficient C.

Since the number of data of the distortion coefficient C is equal to the number of approximation coefficients $\Lambda$ to be determined, in the fitting, nine equations are produced by substituting the data $B_{11}, B_{12}, \ldots, B_{33}$ into the power function (1C) and values of the nine approximation coefficients $\Lambda_{00}, \Lambda_{01}, \Lambda_{02}, \Lambda_{10}, \Lambda_{11}, \Lambda_{12}, \Lambda_{20}, \Lambda_{21}$, and $\Lambda_{22}$ are determined from the nine equations as simultaneous equations. One method for increasing the fitting accuracy is to increase the number of data of the distortion coefficient C to 10 or more and perform fitting by the least-squares method.

The calculated approximation curved surfaces $S_A$, $S_B$, and $S_C$, that is, the values of the 27 approximation coefficients $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}, \Delta_{00}, \Delta_{01}, \Delta_{02}, \Delta_{10}, \Delta_{11}, \Delta_{12}, \Delta_{20}, \Delta_{21}, \Delta_{22}, \Lambda_{00}, \Lambda_{01}, \Lambda_{02}, \Lambda_{10}, \Lambda_{11}, \Lambda_{12}, \Lambda_{20}, \Lambda_{21}$, and $\Lambda_{22}$, are the distortion correcting information I shown in FIG. 1. In storing these values in the ROM 11B, it is appropriate to store the values in the form of a table in which they are correlated with the corresponding approximation coefficients.

One method for approximating the distributions of the distortion coefficients A, B, and C with higher accuracy is to increase the number of terms of the power functions (1A), (1B), and (1C) which represent the approximation curved surfaces $S_A$, $S_B$, and $S_C$. However, when the number of terms is increased, the number of approximation coefficients also increases and hence the information amount of the distortion correcting information I increases. In view of this, in the embodiment, the number of terms of the power functions (1A), (1B), and (1C) set as small as 9 respectively and the number of approximation coefficients are set as small as a total of 27.

Next, the procedure of a distortion correcting process using the distortion correcting information I will be described.

Figure 10:
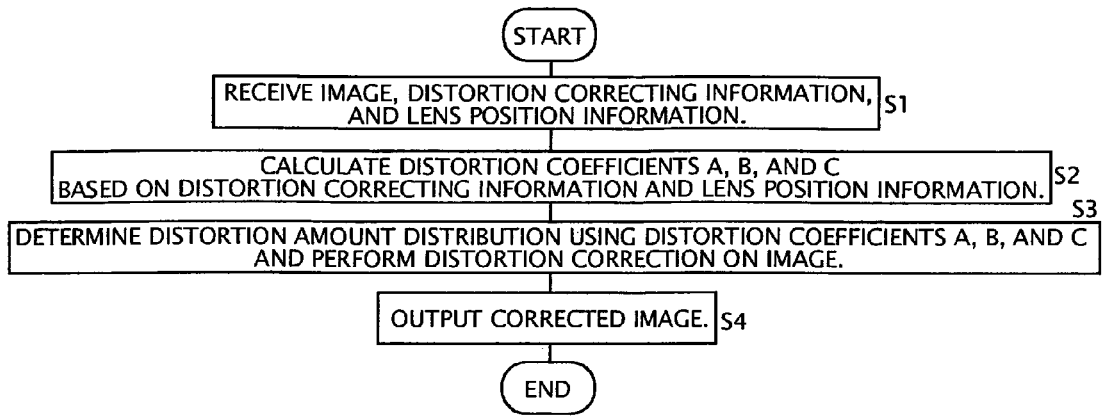
FIG. 10 is a flowchart showing the procedure of a distortion correcting process according to the first embodiment.

FIG. 10 is a flowchart showing the procedure of the distortion correcting process which is executed by the image processing circuit 17. As shown in FIG. 10, the image processing circuit 17 receives an image, the distortion correcting information I, and lens position information (step S1).

The approximation curved surface $S_A$ (see FIG. 7) of the distortion coefficient A becomes known from the above-described power function (1A) and the nine approximation coefficients $\Gamma_{00}, \Gamma_{01}, \Gamma_{02}, \Gamma_{10}, \Gamma_{11}, \Gamma_{12}, \Gamma_{20}, \Gamma_{21}$, and $\Gamma_{22}$ included in the distortion correcting information I among the received information.

The approximation curved surface $S_B$ (see FIG. 8) of the distortion coefficient B becomes known from the above-described power function (1B) and the nine approximation coefficients $\Delta_{00}, \Delta_{01}, \Delta_{02}, \Delta_{10}, \Delta_{11}, \Delta_{12}, \Delta_{20}, \Delta_{21}$, and $\Delta_{22}$ included in the distortion correcting information I.

The approximation curved surface $S_C$ (see FIG. 9) of the distortion coefficient C becomes known from the above-described power function (1C) and the nine approximation coefficients $\Lambda_{00}, \Lambda_{01}, \Lambda_{02}, \Lambda_{10}, \Lambda_{11}, \Lambda_{12}, \Lambda_{20}, \Lambda_{21}$, and $\Lambda_{22}$ included in the distortion correcting information I.

Furthermore, a lens position (focal position d and focal length f values) at the time of shooting becomes known from the lens position information.

The image processing circuit 17 calculates a value of the distortion coefficient A at the time of shooting by applying the lens position (focal position d and focal length f values) at the time of shooting to the known approximation curved surface $S_A$ of the distortion coefficient A.

Likewise, the image processing circuit 17 calculates a value of the distortion coefficient B at the time of shooting by applying the lens position (focal position d and focal length f values) at the time of shooting to the known approximation curved surface $S_B$ of the distortion coefficient B.

Likewise, the image processing circuit 17 calculates a value of the distortion coefficient C at the time of shooting by applying the lens position (focal position d and focal length f values) at the time of shooting to the known approximation curved surface $S_C$ of the distortion coefficient C.

Then, the image processing circuit 17 substitutes the calculated values of the three distortion coefficients A, B, and C into the function (1) and thereby makes known a distortion amount distribution (refer to the function (1)) occurring in the image (step S2).

Subsequently, the image processing circuit 17 performs coordinate conversion on the image in such a direction that the values of the distortion amount distribution occurring in the image are reduced, and performs pixel interpolation if necessary. The distortion correction on the image is thus completed (step S3). Then, the image processing circuit 17 outputs a distortion-corrected image or the distortion-corrected image plus the lens position information (step S4). This image is recorded in the recording section 16.

As described above, in this camera system, the distortion aberration information I of the zoom lens 11L is stored in advance in the ROM 11B of the interchangeable lens 11. Its information amount is roughly equal to that in Patent Document 1 (refer to Tables 1 and 2 of Patent Document 1).

However, the distortion correcting information I is not information of the distortion coefficients A, B, and C corresponding to plural lens positions as in Patent Document 1 but information for determining an approximation curved surface $S_A$ (see FIG. 7) of the distortion coefficient A, an approximation curved surface $S_B$ (see FIG. 8) of the distortion coefficient B, and an approximation curved surface $S_C$ (see FIG. 9) of the distortion coefficient C. Such distortion correcting information I represents distortion coefficients A, B, and C corresponding to all lens positions though it is small in information amount.

Therefore, as long as approximation curved surfaces $S_A$, $S_B$, and $S_C$ were determined in advance with high accuracy, this camera system can calculate a distortion amount distribution of a picked-up image with high accuracy irrespective of the lens position and perform distortion correction on it with high accuracy.

In this camera system, the power function (1A) which represents the approximation curved surface $S_A$ may include at least one of a term of a multiple root of the reciprocal of the focal length f (e.g., $f^{-1/2}=1/\sqrt{f}$) and a term of a positive integer power of the focal length f (e.g., f or $f^2$). Exemplary power functions (2A) and (3A) including such terms are as follows:

[Formula 10]

$$A(f, d) \equiv \sum_{i=0}^{2} \sum_{j=0,\frac{1}{2},1,2} \Gamma_{ij} d^{-i} f^{-j} \quad (2A)$$

[Formula 11]

$$A(f, d) \equiv \sum_{i=0,-1,-2} \sum_{j=-1,0,1} \Gamma_{ij} d^i f^j \quad (3A)$$

Likewise, each of the power functions which represent the approximation curved surfaces $S_B$ and $S_C$ may include at least one of a term of a multiple root of the reciprocal of the focal length f and a term of a positive integer power of the focal length f.

It is desirable that the manufacturer obtain approximation curved surfaces $S_A$, $S_B$, and $S_C$ with as high accuracy using as small a number of terms as possible by properly combining terms of a multiple root, positive and negative integer powers, etc.

In this camera system, each of the distributions of the distortion coefficients A, B, and C is approximated by the function (curved surface) of both of the focal position d and the focal length f because the imaging lens attached to the camera main body 10 is the zoom lens 11L. Where the imaging lens is a single focus lens (i.e., a lens whose focal length f is fixed), each distribution may be approximated by a function (curved surface) of only the focal position d. Furthermore, although in this camera system the number of distortion coefficients (refer to the function (1)) is three, it may be increased or decreased as appropriate. Usually, the number of distortion coefficients increases for a complex distortion amount distribution and decreases for a simple distortion amount distribution.

Embodiment 2

A second embodiment of the invention will be described below. This embodiment is directed to a computer system including a camera system.

First, the configuration of this system will be described.

Figure 11:
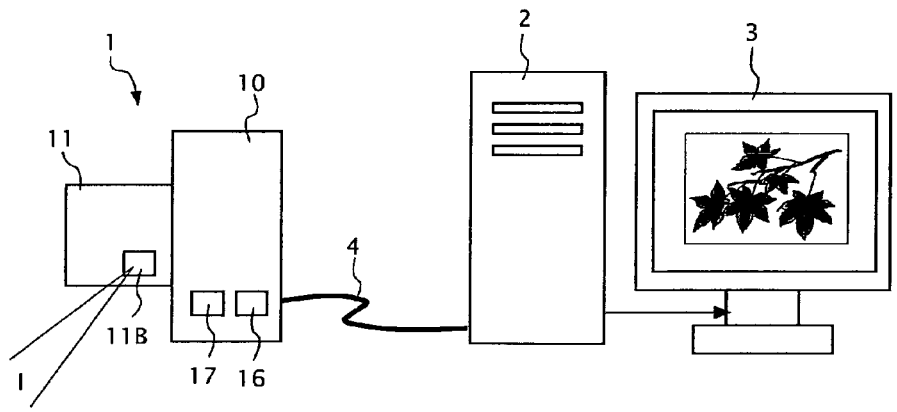
FIG. 11 shows the configuration of a system according to a second embodiment.

FIG. 11 shows the configuration of this system. As shown in FIG. 11, this system is made up of a camera system 1, a computer 2, and a monitor 3. A camera body 10 of the camera system 1 and the computer 2 are coupled to each other by a cable 4. The same distortion correcting information I as in the first embodiment is stored in a ROM 11B of an interchangeable lens 11 of the camera system 1. A distortion correcting program is installed in the computer 2 in advance via a medium such as the Internet or a CD-ROM.

Next, the operation of the camera system 1 will be described. Only a difference from the operation of the camera system according to the first embodiment will be described here. The difference is that the image processing circuit 17 performs preprocessing of distortion correction when the camera body 10 is not set to a distortion correcting mode.

Figure 12:
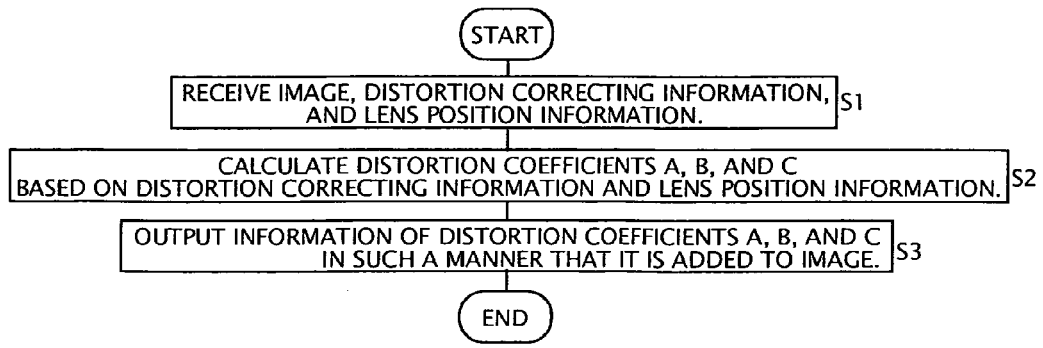
FIG. 12 is a flowchart showing the procedure of a preprocess of distortion correction.

FIG. 12 is a flowchart showing the procedure of a preprocess of distortion correction. As shown in FIG. 12, the image processing circuit 17 receives an image, the distortion correcting information I, and lens position information (step S1) and calculates values of the distortion coefficients A, B, and C in the same manner as in the first embodiment (step S2). Then, instead of performing distortion correction, the image processing circuit 17 adds information indicating the values of the distortion coefficients A, B, and C to the image and outputs a resulting image. The image is recorded in the recording section 16 of the camera body 10.

Next, the operation of the computer 2 will be described. The computer 2 takes in the image stored in the recording section 16 of the camera body 10 with proper timing via the cable 4. Then, the computer 2 performs distortion correction on the taken-in image according to the distortion correcting program which was installed in advance.

In the distortion correcting process, first, the computer 2 recognizes the values of the distortion coefficients A, B, and C that are added to the image. A distortion amount distribution of the image is made known by substituting these values into the function (1). The computer 2 performs coordinate conversion on the image in such a direction that the values of the distortion amount distribution occurring in the image are reduced, and performs pixel interpolation if necessary. The distortion correction on the image is thus completed. Then, the computer 2 displays a distortion-corrected image on the monitor 3 and, if necessary, stores it.

As described above, in this system, the camera body 10 calculates values of the distortion coefficients A, B, and C based on the distortion correcting information I which is stored in the ROM 11B of the interchangeable lens 11 and the information of those values is added to an image. Therefore, the computer 2 can perform distortion correction with the same, high level of accuracy as the camera body 10 of the first embodiment does even if it does not recognize the above-described power functions (1A), (1B), and (1C) at all.

Although in this system, preprocessing of distortion correction (i.e., calculation of values of the distortion coefficients A, B, and C) is performed on the camera body 10 side, the distortion correcting program may be modified so that it is performed on the computer 2 side. In this case, the image processing circuit 17 of the camera body 10 merely adds the distortion correcting information I and lens position information or only the lens position information to an image.

Although this system employs the computer 2, it is possible to employ a storage unit, a printer, or the like incorporating an image processing function in place of the computer 2 and to cause the storage unit, a printer, or the like to perform the same distortion correction as described above.

[Others]

Although the camera system 1 made up of the interchangeable lens 11 and the camera body 10 was described in the first and second embodiments, the invention can also be applied to a camera with a built-in lens. In the case of a camera with a built-in lens, the distortion correcting information I may be stored at any location in the camera.

Although in the first and second embodiments a distortion amount distribution is represented by the fourth-order function (1), it may be represented by a fifth-order or even higher order function. Or a distortion amount distribution may be represented by a third-order or even lower order function.

Embodiment 3

A third embodiment of the invention will be described below. This embodiment is to prepare distortion correcting information I which is necessary for software, an electronic camera, or the like to perform distortion correction. Since distortion correcting information I is unique to a type (specification) of an imaging lens, it is prepared in advance by a manufacturer of each lens. Distortion correcting information I that is prepared in this embodiment can be used in the above-described embodiments.

Figure 13:
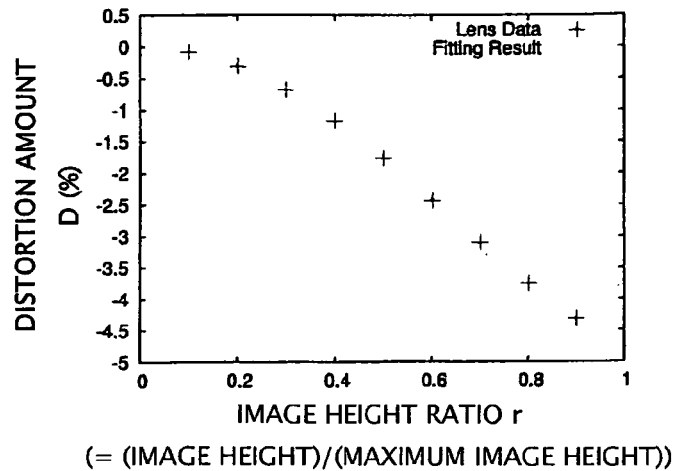
FIG. 13 shows an example of distortion aberration data (i.e., a distortion amount distribution to occur in an image) in a state that a certain lens has a certain lens position.

FIG. 13 shows an example of distortion aberration data (i.e., a distortion amount distribution to occur in an image) in a state that a certain lens has a certain lens position. In FIG. 13, the horizontal axis represents the image height ratio r and the vertical axis represents the distortion amount D. When the distortion amount D is to be approximated by a function of the image height ratio r, exemplary candidates for such a function are the following five functions (12), (13), (14), (15), and (16) (A, B, and C are distortion coefficients):

$$D(r) \equiv Ar^3 + Br^2 + Cr \quad (12)$$

$$D(r) \equiv Ar^4 + Br^3 + Cr^2 \quad (13)$$

$$D(r) \equiv Ar^3 + Br^2 \quad (14)$$

$$D(r) \equiv Ar^4 + Br^3 \quad (15)$$

$$D(r) \equiv Ar^5 + Br^3 \quad (16)$$

Figure 14:
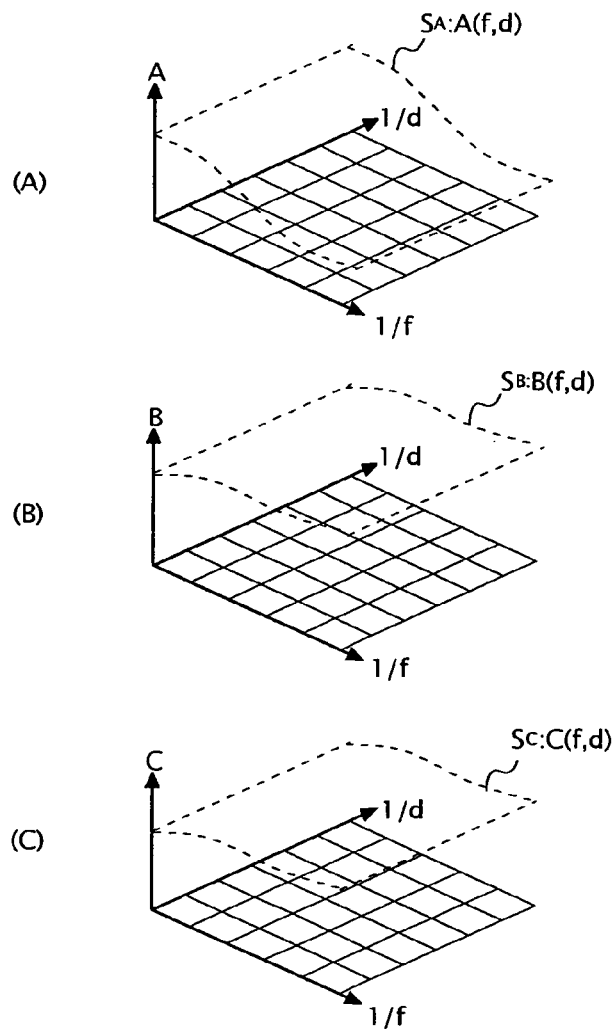
FIG. 14 shows distributions of distortion coefficients A, B, and C in the d and f directions.

The distortion coefficients A, B, and C of each of these functions vary depending on the lens position (the combination of the focal position d and the focal length f) of the lens. A distribution of the distortion coefficient A in the d and f directions, a distribution of the distortion coefficient B in the d and f directions, and a distribution of the distortion coefficient C in the d and f directions can be approximated by smooth curved surfaces $S_A$, $S_B$, and $S_C$ which are indicated by broken lines in parts (A), (B), and (C) of FIG. 14, respectively. However, the shapes of the curves shown in FIG. 14 are just examples and are not necessarily the same as actual ones.

In this embodiment, consideration will be given to how to approximate the distortion coefficients A, B, and C by functions (17A), (17B), and (17C) of d and f, respectively.

[Formulae 12]

$$A(f, d) \equiv \sum_{i=0}^{2} \sum_{j=0}^{2} \Gamma_{ij} d^{-i} f^{-j} \quad (17A)$$

$$B(f, d) \equiv \sum_{i=0}^{2} \sum_{j=0}^{2} \Delta_{ij} d^{-i} f^{-j} \quad (17B)$$

$$C(f, d) \equiv \sum_{i=0}^{2} \sum_{j=0}^{2} \Lambda_{ij} d^{-i} f^{-j} \quad (17C)$$

In the following, the functions (17A), (17B), and (17C) will be referred to as "functions for coefficients" and the above-mentioned functions (12)-(16) will be referred to as "distortion amount functions."

The function (17A) for a coefficient is made up of nine terms that are different in the combination of the orders of d and f and includes nine approximation coefficients $\Gamma_{00}$, $\Gamma_{01}$, $\Gamma_{02}$, $\Gamma_{10}$, $\Gamma_{11}$, $\Gamma_{12}$, $\Gamma_{20}$, $\Gamma_{21}$, and $\Gamma_{22}$.

The function (17B) for a coefficient is made up of nine terms that are different in the combination of the orders of d and f and includes nine approximation coefficients $\Delta_{00}$, $\Delta_{01}$, $\Delta_{02}$, $\Delta_{10}$, $\Delta_{11}$, $\Delta_{12}$, $\Delta_{20}$, $\Delta_{21}$, and $\Delta_{22}$.

The function (17C) for a coefficient is made up of nine terms that are different in the combination of the orders of d and f and includes nine approximation coefficients $\Lambda_{00}$, $\Lambda_{01}$, $\Lambda_{02}$, $\Lambda_{10}$, $\Lambda_{11}$, $\Lambda_{12}$, $\Lambda_{20}$, $\Lambda_{21}$, and $\Lambda_{22}$.

In this case, the above-mentioned distortion amount functions (12)-(16) are expressed as the following equations (12')-(16'), respectively:

[Formulae 13]

$$D(r, f, d) \equiv \sum_{i=0}^{2} \sum_{j=0}^{2} \Gamma_{ij} d^{-i} f^{-j} r^3 + \sum_{i=0}^{2} \sum_{j=0}^{2} \Delta_{ij} d^{-i} f^{-j} r^2 + \sum_{i=0}^{2} \sum_{j=0}^{2} \Lambda_{ij} d^{-i} f^{-j} r \quad (12')$$

$$D(r, f, d) \equiv \sum_{i=0}^{2} \sum_{j=0}^{2} \Gamma_{ij} d^{-i} f^{-j} r^4 + \sum_{i=0}^{2} \sum_{j=0}^{2} \Delta_{ij} d^{-i} f^{-j} r^3 + \sum_{i=0}^{2} \sum_{j=0}^{2} \Lambda_{ij} d^{-i} f^{-j} r^2 \quad (13')$$

$$D(r, f, d) \equiv \sum_{i=0}^{2} \sum_{j=0}^{2} \Gamma_{ij} d^{-i} f^{-j} r^3 + \sum_{i=0}^{2} \sum_{j=0}^{2} \Delta_{ij} d^{-i} f^{-j} r^2 \quad (14')$$

$$D(r, f, d) \equiv \sum_{i=0}^{2} \sum_{j=0}^{2} \Gamma_{ij} d^{-i} f^{-j} r^4 + \sum_{i=0}^{2} \sum_{j=0}^{2} \Delta_{ij} d^{-i} f^{-j} r^3 \quad (15')$$

$$D(r, f, d) \equiv \sum_{i=0}^{2} \sum_{j=0}^{2} \Gamma_{ij} d^{-i} f^{-j} r^5 + \sum_{i=0}^{2} \sum_{j=0}^{2} \Delta_{ij} d^{-i} f^{-j} r^3 \quad (16')$$

Among these functions, each of the distortion amount functions (12') and (13') has three terms of r and hence includes 27 approximation coefficients ($\Gamma_{00}$, $\Gamma_{01}$, $\Gamma_{02}$, $\Gamma_{10}$, $\Gamma_{11}$, $\Gamma_{12}$, $\Gamma_{20}$, $\Gamma_{21}$, $\Gamma_{22}$, $\Delta_{00}$, $\Delta_{01}$, $\Delta_{02}$, $\Delta_{10}$, $\Delta_{11}$, $\Delta_{12}$, $\Delta_{20}$, $\Delta_{21}$, $\Delta_{22}$, $\Lambda_{00}$, $\Lambda_{01}$, $\Lambda_{02}$, $\Lambda_{10}$, $\Lambda_{11}$, $\Lambda_{12}$, $\Lambda_{20}$, $\Lambda_{21}$, and $\Lambda_{22}$) in total.

On the other hand, each of the distortion amount functions (14')-(16') has two terms of r and hence includes 18 approximation coefficients ($\Gamma_{00}$, $\Gamma_{01}$, $\Gamma_{02}$, $\Gamma_{10}$, $\Gamma_{11}$, $\Gamma_{12}$, $\Gamma_{20}$, $\Gamma_{21}$, $\Gamma_{22}$, $\Delta_{00}$, $\Delta_{01}$, $\Delta_{02}$, $\Delta_{10}$, $\Delta_{11}$, $\Delta_{12}$, $\Delta_{20}$, $\Delta_{21}$, and $\Delta_{22}$).

Therefore, where the distortion amount function (12) or (13) is used for approximating distortion aberration data, the manufacturer can employ values of the 27 approximation coefficients as distortion correcting information I. Where one of the distortion amount functions (14), (15), and (16) is used for approximating distortion aberration data, the manufacturer can employ values of the 18 approximation coefficients as distortion correcting information I. Distortion correction can be performed on substituting the values of the approximation coefficients included in the distortion correcting information I into one of the distortion amount functions (12')-(16') and thereby obtaining a calculation formula for uniquely determining a distortion amount distribution in an image from a lens position d and f.

In this embodiment, the manufacturer prepares distortion aberration data corresponding to respective lens positions of a lens. Although the distortion aberration data may be data that were obtained by a simulation based on lens design data or measured data of the lens, it is desirable that the distortion aberration data be as detailed data as possible. The manufacturer evaluates the distortion amount functions (12)-(16) using the distortion aberration data.

To evaluate the distortion amount function (12), first, the manufacturer fits the distortion amount function (12) to the distortion aberration data corresponding to each lens position (by the least-squares method, for example) and estimates fitting errors corresponding to each lens position. The fitting errors are expressed by deviations between a distortion amount distribution obtained by the fitting and the plural distortion aberration data used for the fitting. In the following, a deviation corresponding to each of the plural distortion aberration data will be referred to as "approximation error." After estimating approximation errors corresponding to each lens position, the manufacturer evaluates the performance of the distortion amount function (12) based on magnitudes and a distribution of the approximation errors.

To evaluate the distortion amount function (13), first, the manufacturer fits the distortion amount function (13) to the distortion aberration data corresponding to each lens position and estimates approximation errors corresponding to each lens position. Then, the manufacturer evaluates the performance of the distortion amount function (13) based on magnitudes and a distribution of the approximation errors corresponding to each lens position.

To evaluate the distortion amount function (14), first, the manufacturer fits the distortion amount function (14) to the distortion aberration data corresponding to each lens position and estimates approximation errors corresponding to each lens position. Then, the manufacturer evaluates the performance of the distortion amount function (14) based on magnitudes and a distribution of the approximation errors corresponding to each lens position.

To evaluate the distortion amount function (15), first, the manufacturer fits the distortion amount function (15) to the distortion aberration data corresponding to each lens position and estimates approximation errors corresponding to each lens position. Then, the manufacturer evaluates the performance of the distortion amount function (15) based on magnitudes and a distribution of the approximation errors corresponding to each lens position.

To evaluate the distortion amount function (16), first, the manufacturer fits the distortion amount function (16) to the distortion aberration data corresponding to each lens position and estimates approximation errors corresponding to each lens position. Then, the manufacturer evaluates the performance of the distortion amount function (16) based on magnitudes and a distribution of the approximation errors corresponding to each lens position.

Figure 15:
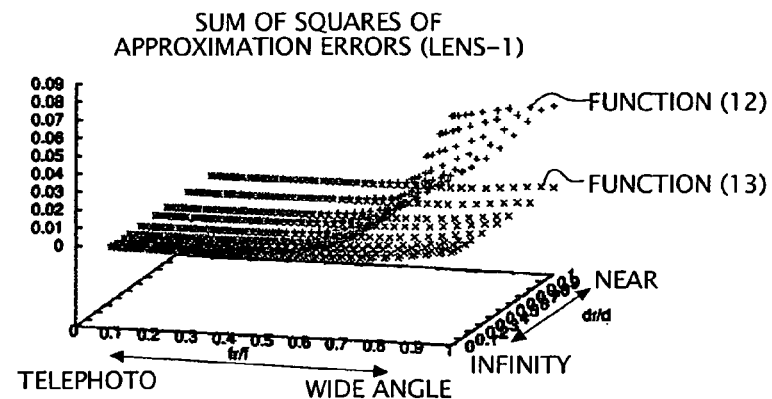
FIG. 15 is a graph comparing approximation errors of a distortion amount function (12) and those of a distortion amount function (13) (data relating to the same, certain lens-1).

FIG. 15 is a graph comparing approximation errors of the distortion amount function (12) and those of the distortion amount function (13) (data relating to the same lens-1). FIG. 15 shows approximation errors corresponding to respective lens positions, and each value associated with the vertical axis is the sum of squares of approximation errors at all image heights. It is seen from FIG. 15 that at least for lens-1 the distortion amount function (13) can provide smaller approximation errors than the distortion amount function (12).

Figure 16:
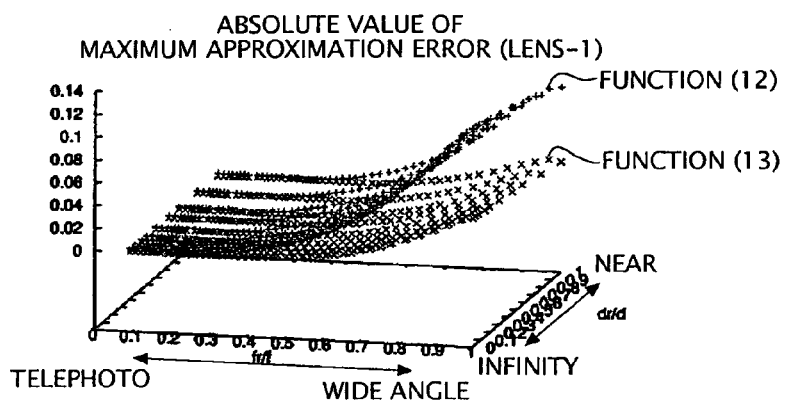
FIG. 16 is a graph which is different from FIG. 15 in that the vertical axis represents the absolute value of a maximum value of approximation errors at all image heights.

FIG. 16 is different from FIG. 15 in that the vertical axis represents the absolute value of a maximum value of approximation errors at all image heights corresponding to each lens position. It is also seen from this figure that the distortion amount function (13) can provide smaller approximation errors than the distortion amount function (12).

Incidentally, whereas FIGS. 15 and 16 show the data relating to lens-1, the inventors made examinations for other plural types of lenses to produce results that also for those lenses the distortion amount function (13) provided smaller approximation errors than the distortion amount function (12). It is therefore concluded that the distortion amount function (13) produces smaller approximation errors and hence is more effective than the distortion amount function (12) though they have the same number of terms. That is, the distortion amount function (13) can reduce approximation errors while suppressing increase of the information amount of the distortion correcting information I.

Figure 17:
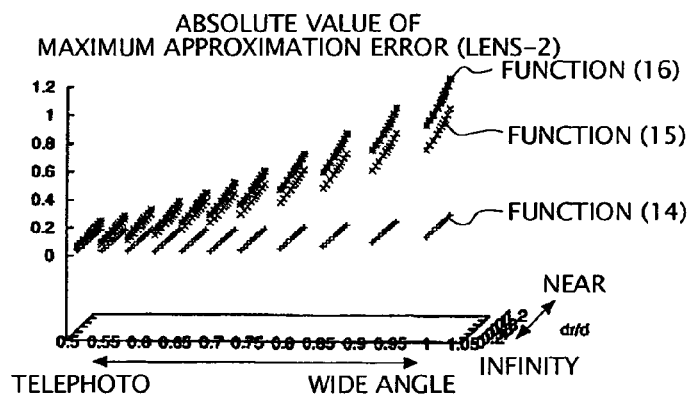
FIG. 17 is a graph comparing approximation errors of a distortion amount function (14), those of a distortion amount function (15), and those of a distortion amount function (16) (data relating to the same, certain lens-2).

Next, FIG. 17 is a graph comparing approximation errors of the distortion amount function (14), those of the distortion amount function (15), and those of the distortion amount function (16) (data relating to the same, certain lens-2). FIG. 17 shows approximation errors corresponding to respective lens positions, and each value associated with the vertical axis is the absolute value of a maximum value of approximation errors at all image heights corresponding to each lens position. It is seen from FIG. 17 that at least for lens-2 the distortion amount function (15) can provide smaller approximation errors than the distortion amount function (16) and the distortion amount function (14) can provide smaller approximation errors than the distortion amount function (15).

Figure 18:
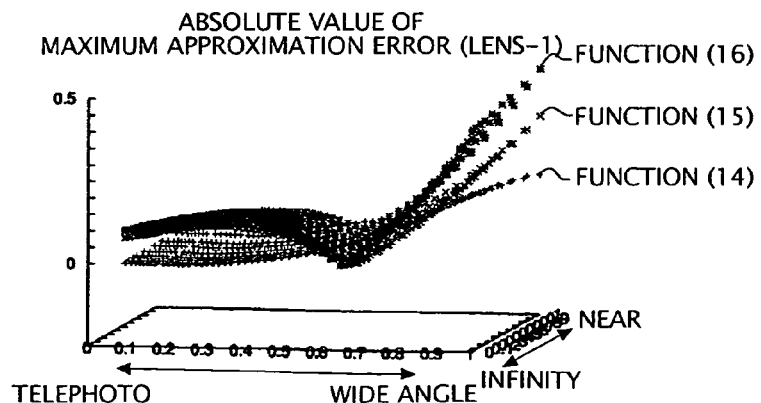
FIG. 18 is a graph comparing approximation errors of the distortion amount functions (14), (15), and (16) for lens-1 instead of lens-2.

FIG. 18 is a graph comparing approximation errors of the distortion amount functions (14), (15), and (16) for lens-1. FIG. 18 shows approximation errors corresponding to respective lens positions, and each value associated with the vertical axis is the absolute value of a maximum value of approximation errors at all image heights corresponding to each lens position. It is seen from FIG. 18 that for lens-1 the distortion amount function (14) is effective in reducing the lens-position-dependent variation of approximation errors. On the other hand, although the distortion amount functions (15) and (16) reduce approximation errors corresponding to part of the lens positions, they increase approximation errors corresponding to the other lens positions. It is therefore seen that the distortion amount function (14) is most preferable also for lens-1.

Now, we compare the data of the distortion amount function (14) of FIG. 18 with the data of the distortion amount function (13) of FIG. 16. These sets of data relate to the same lens-1. It is seen from these figures that the approximation errors of the distortion amount function (14) are somewhat larger than those of the distortion amount function (13). However, the number of terms of the distortion amount function (14) is smaller by one than that of the distortion amount function (13). Therefore, the distortion amount function (14) is effective in reducing the information amount of the distortion aberration information while making approximation errors small.

As described above, in this embodiment, the manufacturer approximates distortion aberration data of a lens by plural types of distortion amount functions and estimates approximation errors caused by each type of distortion amount function. If, for example, the desired accuracy of distortion correction is sufficiently high (e.g., in the case where distortion correction is performed on software or the lens is of a high grade type), the manufacturer selects one having a smallest number of terms (e.g., the distortion amount function (13)) from distortion amount functions that make approximation errors sufficiently small. If the allowable information amount of the distortion correcting information I is small (e.g., in the case where distortion correction is performed on an electronic camera or the lens is of a standard type), the manufacturer selects one that produces smallest approximation errors (e.g., the distortion amount function (14)) from distortion amount functions whose numbers of terms are sufficiently small.

Subsequently, if the distortion amount function (13), for example, has been selected, the manufacturer acquires values of the 27 approximation coefficients by fitting the functions (17A), (17B), and (17C) for coefficients to the values of the distortion coefficients A, B, and C that have been obtained for each lens position by fitting the distortion amount functions (13). Therefore, in this case, these values of the 27 approximation coefficients are prepared as distortion correcting information I of the lens. Incidentally, in actual distortion correction, the values of the 27 approximation coefficients included in the distortion correcting information I are substituted into the distortion amount function (13') and the distortion correction is performed according to a resulting calculation formula.

If the distortion amount function (14), for example, has been selected, the manufacturer acquires values of the 18 approximation coefficients by fitting the functions (17A), and (17B) for coefficients to the values of the distortion coefficients A and B that have been obtained for each lens position by fitting the distortion amount functions (14). Therefore, in this case, these values of the 18 approximation coefficients are prepared as distortion correcting information I of the lens. Incidentally, in actual distortion correction, the values of the 18 approximation coefficients included in the distortion correcting information I are substituted into the distortion amount function (14') and distortion correction is performed according to a resulting calculation formula.

If another distortion amount function has been selected, the manufacturer acquires values of the approximation coefficients that are necessary for the selected distortion amount function in the same manner as in the cases of distortion amount functions (13) and (14) and prepares them as distortion correcting information I.

As described above, according to the embodiment, since distortion correcting information I which is most suitable for each lens is prepared, actual distortion correction can be performed satisfactorily in a reliable manner.

Although in the embodiment the five types of distortion amount functions (12)-(16) are examined, other types of distortion amount functions may be added as subjects of examination.

In such a case, although distortion amount functions having a large number of terms may be added, when both of the distortion correction accuracy and the information amount are taken into consideration, at present it is realistic to employ distortion amount functions having four or less terms. Where the use of distortion amount functions having a three or more terms is allowable, it is preferable to employ, as subjects of examination, distortion amount functions including a second-order term, a third-order term, and a fourth-order term of r.

Incidentally, it is expected that the following distribution amount function (17) produces smaller approximation errors than other types of distortion amount functions having the same number of terms (e.g., $D(r) \equiv Ar^4 + Br^3 + Cr^2 + Dr$) because it is made up of second and higher order terms like the distortion amount functions (13) and (14) though it is larger than the above-described distortion amount function (13) by one in the number of terms.

$$D(r) \equiv Ar^5 + Br^4 + Cr^3 + Dr^2 \qquad (17)$$

Among the distortion coefficients, A, B, and C can be approximated by the functions (17A), (17B), and (17C) for coefficients and D can be approximated by a similar function for a coefficient (e.g., an inverse power function of d and f).

In the embodiment, it is not necessary to examine all distortion amount functions for every lens. For example, if the tendency of the distortion aberration of a certain lens is similar to that of another type of lens that has already been examined, several distortion amount functions may be excluded from subjects of examination.

However, according to studies of plural types of lenses done by the inventors, at least the above-described distortion amount functions (13) and (14) were found effective at high probabilities. Therefore, it is desirable that the distortion amount functions (13) and (14) be included in subjects of examination unless there is some reason to the contrary.

Although in the embodiment the distortion coefficient A (function (17A) for a coefficient) is made up of terms of inverse powers of f and d, it may include a term of a multiple root of the reciprocal of the focal length f (e.g., $f^{-1/2} = 1/\sqrt{f}$) or a term of a positive integer power the focal length f (e.g., f or $f^2$). Exemplary functions (17A') and (17A") for coefficient including such terms are as follows:

[Formula 14]

$$A(f, d) \equiv \sum_{i=0}^{2} \sum_{j=0,\frac{1}{2},1,2} \Gamma_{ij} d^{-i} f^{-j} \qquad (17A')$$

$$A(f, d) \equiv \sum_{i=0,-1,-2} \sum_{j=-1,0,1} \Gamma_{ij} d^i f^j \qquad (17A'')$$

Likewise, the distortion coefficient B (function (17B) for a coefficient), the distortion coefficient C (function (17C) for a coefficient), and the distortion coefficient D may also include a term of a multiple root of the reciprocal of the focal length f or a term of a positive integer power the focal length f.

In the embodiment, it is assumed that both of the focal length f and the focal position d of a lens are variable. However, in the case of a single focus lens in which f is fixed, each of the above-described distortion coefficients A, B, C, and D is approximated by a function of only d. In this case, the number of terms of each of the functions (17A), (17B), and (17C) for coefficient becomes three.

Embodiment 4

A fourth embodiment of the invention will be described below. This embodiment is directed to image editing software (distortion correcting program) having a distortion correcting function. This software is installed in a computer of a user of an electronic camera via the Internet, a CD-ROM, or the like. The details of this program will be described here by describing the operation of the computer.

Figure 19:
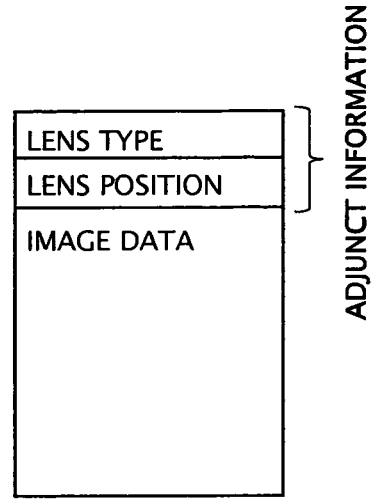
FIG. 19 illustrates adjunct information which is added to image data.

Upon being coupled to an electronic camera, a computer takes in image data that is stored in the electronic camera. The image data is made a subject of distortion correction. As shown in FIG. 19, the image data has, as adjunct information, information indicating a type of lens used and information indicating a lens position d and f at the time of shooting. Such adjunct information is added together with other information (an exposure, a shutter speed, a date and time of shooting, etc.) by the electronic camera at the time of shooting.

Various types of distortion amount functions (assumed here to be two types of distortion amount functions (13') and (14')) are stored in the computer in advance, and pieces of distortion correcting information I of plural types of lenses are stored in the computer in advance in the form of a table, for example (see FIG. 20). In this table, the pieces of distortion correcting information I are stored for the respective lens types and the distortion correcting information I of each lens is made up of a type of distortion amount function that is most suitable for the lens and values of the approximation coefficients included in the distortion amount function.

A distortion amount function that produces as small approximation errors as possible (one having as small a number of terms if there are plural distortion amount functions that produce approximately the same level of approximation errors) is selected in advance as a type of distortion amount function that is most suitable for each lens (in FIG. 20, the distortion amount functions (13) and (14) are indicated by "13" and "14," respectively). The method for selecting a type of distortion amount function and the method for acquiring values of approximation coefficients are as described in the third embodiment.

In distortion correction, the computer recognizes a lens type and values of a lens position d and f by referring to the adjunct information of the image data. Then, the computer refers to the table and reads the type of distortion amount function and the values of the approximation coefficients that are correlated with the lens type.

If the lens type is "3," for example, the type of distortion amount function "14" and the values of the 18 approximation coefficients are read out. The computer acquires a calculation formula by substituting the values of the 18 approximation coefficients into the distortion amount function (14') stored in advance. The computer makes known a distortion amount distribution in the image by substituting the recognized lens position d and f into the calculation formula. The computer performs distortion correction on the image data according to the distortion amount distribution.

If the lens type is "4," for example, the type of distortion amount function "13" and the values of the 27 approximation coefficients are read out. The computer acquires a calculation formula by substituting the values of the 27 approximation coefficients into the distortion amount function (13') stored in advance. The computer makes known a distortion amount distribution in the image by substituting the recognized lens position d and f into the calculation formula. The computer performs distortion correction on the image data according to the distortion amount distribution.

As described above, types of distortion amount functions that are most suitable for plural respective lens types are stored in advance in the computer according to the embodiment. In calculation of distortion correction, the computer uses a proper distortion amount function according to a lens type. Therefore, satisfactory distortion correction can be performed reliably on each image data.

It is desirable that the contents of the table according to the embodiment be updated (i.e., distortion correcting information I of the new lens type be added to the table) every time a new lens type is put on the market. It is preferable that update information be publicized on the Internet like various types of software to allow a user to download it to a computer.

In the embodiment, the distortion amount functions (13) and (14) (more specifically, the distortion amount functions (13') and (14')) are used. However, since increase in calculation amount does not cause a serious problem on a computer, the distortion amount function (17) or other distortion amount functions described above may be used.

Although the computer is used in the embodiment, it is possible to use a storage unit, a printer, or the like incorporating an image processing function in place of the computer and cause it to perform the same processing as described above.

Embodiment 5

A fifth embodiment of the invention will be described below. This embodiment is directed to an electronic camera with a built-in lens which incorporates a distortion correcting function.

Figure 21:
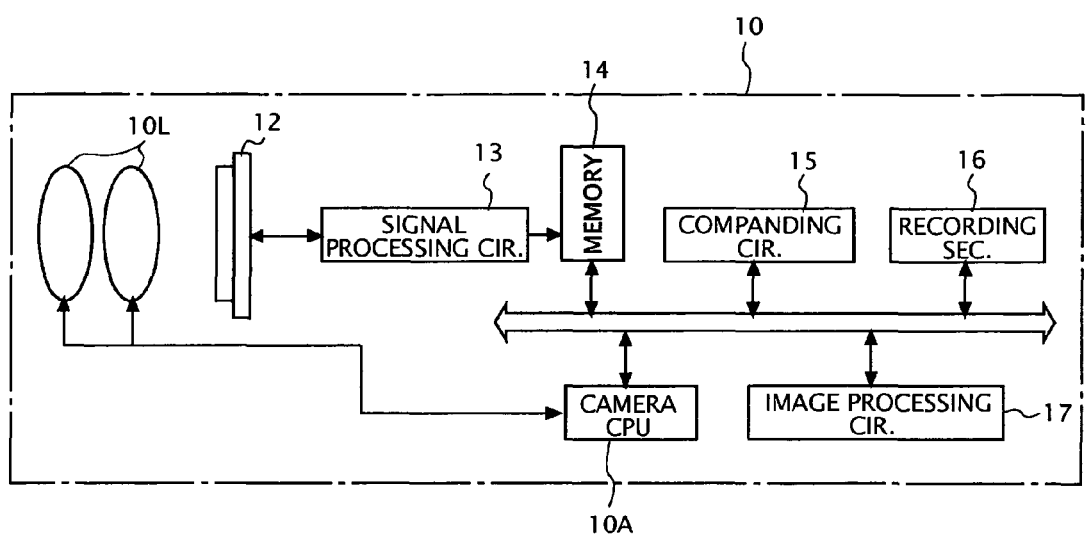
FIG. 21 shows the configuration of a camera according to a fifth embodiment.

FIG. 21 shows the configuration of the camera. As shown in FIG. 21, the camera 10 is equipped with a lens 10L whose lens position (focal position d and focal length f) is variable, a camera CPU 10A, an imaging sensor 12, a signal processing circuit 13, a memory 14, a companding circuit 15, a recording section 16, an image processing circuit 17, etc. Among these components, the camera CPU 10A is equipped with a ROM and a RAM inside.

Distortion correcting information I of the lens 10L is stored in advance in the ROM of the camera CPU 10A. However, the camera 10 is of a lens built-in type and hence the lens type does not vary. Therefore, the distortion correcting information I need not be plural sets of approximation coefficients as mentioned above, and may be a calculation formula obtained by substituting approximation coefficients into a distortion amount function. In the camera 10 with a built-in lens, the desired accuracy of distortion correction is relatively low and the storage capacity of the ROM has a certain limit. Therefore, a type of distortion amount function that produces small approximation errors for a small number of terms, that is, the distortion amount function (14) (more specifically, the distortion amount function (14')), is used. Values of the 18 approximation coefficients of the distortion amount function (14') are acquired in advance by the manufacturer of the camera 10. The acquisition method is as described in the third embodiment. A calculation formula obtained by substituting the values of the 18 approximation coefficients into the distortion amount function (14') is stored in the ROM of the camera CPU 10A.

At the time of shooting, when an object image is formed on the imaging sensor 12 by the lens 10L, the imaging sensor 12 images the object image and acquires image data. The image data is processed in the signal processing circuit 13 and then stored in the memory 14 temporarily. Values of a lens position f and d of the lens 10L at the time of shooting are read by the camera CPU 10A via an encoder (not shown).

The camera CPU 10A substitutes the values of the lens position f and d into the calculation formula which is stored in the ROM and thereby makes known a distortion amount distribution in the image. The image processing circuit 17 performs distortion correction on the image data stored in the memory 14 according to the distortion amount distribution. Distortion-corrected image data is compressed in the companding circuit 15 and recorded in the recording section 16.

As described above, in the camera 10 according to the embodiment, the calculation formula obtained by using the distortion amount function (14) is stored in advance as the distortion correcting information I and distortion correction is performed according to it. Therefore, a certain level of distortion correction effect can be obtained whereas the information amount of the distortion correcting information I is reduced.

Note that, the camera 10 according to the embodiment uses the distortion amount function (14). However, the distortion amount function (13) may be used in place of the distortion amount function (14) in the case where the information amount of the distortion correcting information I can be increased. The distortion amount function (17) may be used in the case where the information amount can be increased further. Furthermore, another distortion amount function made up of only terms of second and higher order powers of r may be used. However, in practice, it is desirable that the total number of terms of r of the distortion amount function be four or less.

Although in the embodiment the storage destination of the distortion correcting information I is the ROM of the camera CPU 10A, it may be a memory that is provided separately from the camera CPU 10A.

In the camera 10 according to the embodiment, distortion correction is performed on image data. However, instead of performing distortion correction, information (e.g., information of a distortion amount distribution (described above)) that is necessary for distortion correction may be added to image data. In this case, distortion correction on the image data is performed on a computer or the like.

Embodiment 6

A sixth embodiment of the invention will be described below. This embodiment is directed to an electronic camera system having a distortion correcting function.

Figure 22:
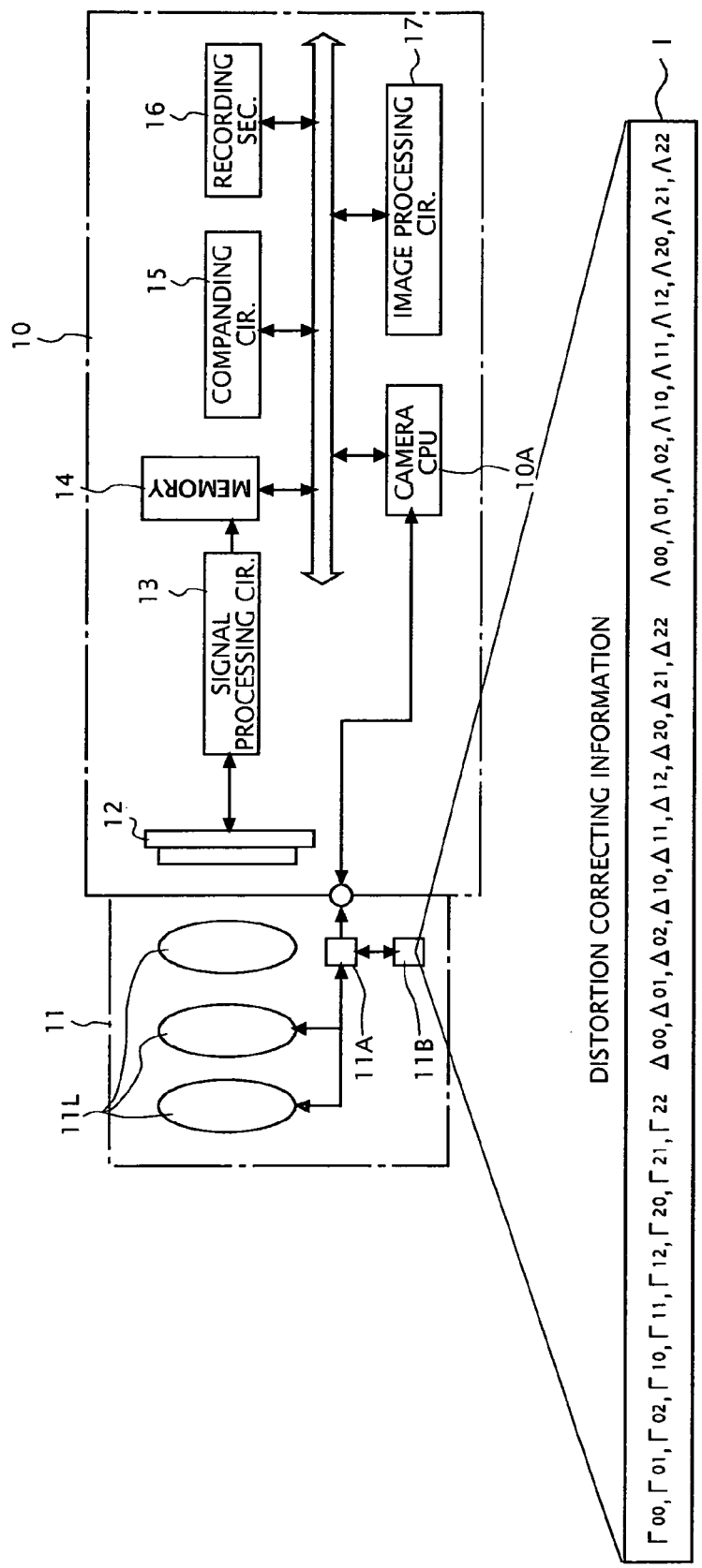
FIG. 22 shows the configuration of a camera system according to a sixth embodiment.

FIG. 22 shows the configuration of this camera system. As shown in FIG. 22, the camera system is made up of an interchangeable lens 11 and a camera 10.

The interchangeable lens 11 is equipped with a lens 11L whose lens position (focal position d and focal length f) is variable, a lens CPU 11A, a ROM 11B, etc. The camera 10 is equipped with a camera CPU 10A, an imaging sensor 12, a signal processing circuit 13, a memory 14, a companding circuit 15, a recording section 16, an image processing circuit 17, etc. Among these components, the camera CPU 10A is equipped with a ROM and a RAM inside.

The distortion amount function (13') is stored in advance in the ROM of the camera CPU 10A, and values of the 27 approximation coefficients of the distortion amount function (13') are stored in the ROM 11B of the interchangeable lens 11 as distortion correcting information I of the lens 11L. The values of the 27 approximation coefficients of the distortion amount function (13') are acquired in advance by a manufacturer of the interchangeable lens 11. The acquisition method is as described in the third embodiment.

The lens CPU 11A of the interchangeable lens 11 reads the values of the 27 approximation coefficients from the ROM 11B with proper timing (e.g., at application of power) and sends them to the camera CPU 10A of the camera 10. The camera CPU 10A acquires a calculation formula by substituting the values of the 27 approximation coefficients into the distortion amount function (13') stored in the ROM.

At the time of shooting, when an object image is formed on the imaging sensor 12 by the lens 11L, the imaging sensor 12 images the object image and acquires image data. The image data is processed in the signal processing circuit 13 and then stored in the memory 14 temporarily. Values of a lens position f and d of the lens 11L at the time of shooting are read by the lens CPU 11A via an encoder (not shown) and sent to the camera CPU 10A of the camera 10.

The camera CPU 10A substitutes the values of the lens position f and d into the above calculation formula and thereby makes known a distortion amount distribution in the image. The image processing circuit 17 performs distortion correction on the image data stored in the memory 14 according to the distortion amount distribution. Distortion-corrected image data is compressed in the companding circuit 15 and recorded in the recording section 16.

Although the above description of the embodiment involves only the one certain interchangeable lens 11, it is assumed that similar pieces of distortion correcting information I (values of 27 approximation coefficients) are stored in advance in other types of interchangeable lenses (not shown), respectively, that can be attached to the camera 10. These sets of the values of 27 approximation coefficients are acquired in advance by a manufacturer of the interchangeable lenses. The acquisition method is as described in the third embodiment.

As described above, in the camera system according to the embodiment, the distortion amount function (13') (i.e., a distortion amount function that produces smaller approximation errors than the other distortion amount functions having the same number of terms) is stored in the camera 10 in advance and values of the 27 approximation coefficients of the distortion amount function (13') are stored in advance in the interchangeable lens 11 (and each of the other types of interchangeable lenses) as the distortion correcting information I. Both types of the information are used in distortion correction. Therefore, in the camera system, a great distortion correction effect can be obtained whereas increase of the information amount of the distortion correcting information I is suppressed.

The camera system according to the embodiment uses the distortion amount function (13) (more specifically, distortion amount function (13')). However, the distortion amount function (14) may be used in place of the distortion amount function (13) in the case where the desired accuracy of distortion correction is low. The distortion amount function (17) may be used in the case where the information amount can be increased. Furthermore, another distortion amount function made up of only terms of second and higher order powers of r may be used. However, in practice, it is desirable that the total number of terms of r of the distortion amount function be four or less.

Although in the embodiment the storage destination of the distortion amount function (13') is the ROM of the camera CPU 10A, it may be a memory that is provided separately from the camera CPU 10A.

In the camera 10 according to the embodiment, distortion correction is performed on image data. However, instead of performing distortion correction, information (e.g., information of a distortion amount distribution (described above)) that is necessary for distortion correction may be added to image data. In this case, distortion correction on the image data is performed on a computer or the like.

Embodiment 7

A seventh embodiment of the invention will be described below. This embodiment is directed to an electronic camera system having a distortion correcting function. Only differences from the sixth embodiment will be described here.

FIG. 23 shows the configuration of this camera system. Differences reside in the information that is stored in the interchangeable lens 11 in advance and the information that is stored in the camera 10 in advance.

Various types of distortion amount functions are stored in advance in the ROM of the camera CPU 10A. For the sake of simplicity, it is assumed here that two types of distortion amount functions, that is, the distortion amount functions (13') and (14'), are stored (to make the information amount as small as possible, the stored information may be the combinations of the distortion amount functions (13) and (14) and the functions (17A), (17B), and (17C) for coefficients).

A type of distortion amount function (in FIG. 23, "13") that is most suitable for the lens 11L and values of the approximation coefficients (values of the 27 approximation coefficients) of the distortion amount function are stored in the ROM 11B of the interchangeable lens 11 as distortion correcting information I of the lens 11L. A distortion amount function that produces as small approximation errors as possible (one having as small a number of terms if there are plural distortion amount functions that produce approximately the same level of approximation errors) is selected in advance as the type of distortion amount function that is most suitable for the lens 11L. The method for selecting a type of distortion amount function and the method for acquiring values of approximation coefficients are as described in the third embodiment. These are done in advance by a manufacturer of the interchangeable lens 11.

Incidentally, a type of distortion amount function (in FIG. 23, "14") that is most suitable for another type of interchangeable lens that can be attached to the camera 10 and values of the approximation coefficients (values of the 18 approximation coefficients) of the distortion amount function are stored in the ROM of the interchangeable lens as distortion correcting information I' of the interchangeable lens. A distortion amount function that produces as small approximation errors as possible (one having as small a number of terms if there are plural distortion amount functions that produce approximately the same level of approximation errors) is selected in advance as the type of distortion amount function that is most suitable for the interchangeable lens. The method for selecting a type of distortion amount function and the method for acquiring values of approximation coefficients are as described in the third embodiment. These are done in advance by a manufacturer of the interchangeable lens.

If the former lens (interchangeable lens 11) is attached to the camera 10, the lens CPU 11A of the interchangeable lens 11 reads the distortion correcting information (in this embodiment, the type of distortion amount function "12" and the values of the 27 approximation coefficients) from the ROM 11B with proper timing (e.g., at application of power) and sends them to the camera CPU 10A of the camera 10. Upon recognizing the type of distortion amount function (in this embodiment, "13"), the camera CPU 10A acquires a calculation formula by substituting the values of the 27 approximation coefficients into the distortion amount function (13') stored in the ROM. The camera 10 performs distortion correction using the calculation formula in the same manner as in the sixth embodiment.

On the other hand, if the latter lens (another interchangeable lens) is attached to the camera 10, the lens CPU of the interchangeable lens reads the distortion correcting information (in this embodiment, the type of distortion amount function "14" and the values of the 18 approximation coefficients) from the ROM with proper timing (e.g., at application of power) and sends them to the camera CPU 10A of the camera 10. Upon recognizing the type of distortion amount function (in this embodiment, "4"), the camera CPU 10A acquires a calculation formula by substituting the values of the 18 approximation coefficients into the distortion amount function (14') stored in the ROM. The camera 10 performs distortion correction by using the calculation formula in the same manner as in the sixth embodiment.

As described above, in the camera system according to the embodiment, various distortion amount functions (in this embodiment, (13') and (14')) are stored in the camera 10 in advance and the type of distortion amount function (in this embodiment, "13" or "14") that is most suitable for the lens and values of the approximation coefficients (in this embodiment, values of the 27 approximation coefficients or the 18 approximation coefficients) of the distortion amount function are stored in advance in the interchangeable lens 11 (and another type of interchangeable lens). Both types of information are used in distortion correction. Therefore, this camera system makes it possible to always perform distortion correction that is most suitable for each interchangeable lens though the amount of information that should be stored in the camera 10 in advance is increased.

The camera system according to the embodiment uses the distortion amount functions (13) and (14) (more specifically, distortion amount functions (13') and (14')). However, the distortion amount function (17) may be used in the case where the information amount can be increased. Furthermore, another distortion amount function made up of only terms of second and higher order powers of r may be used. However, in practice, it is desirable that the total number of terms of r of the distortion amount function be four or less.

Although in the embodiment the storage destination of the distortion amount functions is the ROM of the camera CPU 10A, it may be a memory that is provided separately from the camera CPU 10A.

In the camera 10 according to the embodiment, distortion correction is performed on image data. However, instead of performing distortion correction, information (e.g., information of a distortion amount distribution (described above)) that is necessary for distortion correction may be added to image data. In this case, distortion correction on the image data is performed on a computer or the like.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A distortion correcting method for an image taken by an optical system, comprising the operations of:

preparing, in advance and by a processor of said optical system, approximation information that is obtained when distortion aberration of said optical system is approximated by a continuous function with respect to a shooting condition that is set in said optical system, and when each of one or more coefficients of a function of a position in an imaging plane of said optical system that represents said distortion aberration is approximated by a function of at least one of a focal position and a focal length of said optical system, said shooting condition being at least one of the focal position and the focal length of said optical system; and calculating by a processor distortion of an image taken by said optical system based on said shooting condition that was read by an encoder from said optical system when said image was taken and said approximation information prepared in advance.

2. The distortion correcting method according to claim 1, wherein said function of at least one of said focal position and said focal length is a power function.

3. The distortion correcting method according to claim 2, wherein said approximation information is made up of coefficients of respective terms of said power function.

4. The distortion correcting method according to claim 2, wherein said power function includes a term of raising to an inverse power of said focal position.

5. The distortion correcting method according to claim 2, wherein said power function includes a term of raising to an inverse power of said focal length.

6. The distortion correcting method according to claim 2, wherein said power function includes a term of a multiple root of said focal length.

7. A non-transitory computer-readable medium having stored thereon a distortion correcting program causing a computer to execute said distortion correcting method according to claim 1.

8. An image processing apparatus comprising units which execute said distortion correcting method according to claim 1.

9. An interchangeable lens comprising:

an optical system including a processor that obtains approximation information when distortion aberration of the optical system is approximated by a continuous function with respect to a shooting condition that is set in said optical system is stored therein in advance, and when each of one or more coefficients of a function of a position in an imaging plane of said optical system that represents said distortion aberration is approximated by a function of at least one of a focal position and a focal length of said optical system, said shooting condition being at least one of the focal position and the focal length of said optical system.

10. The interchangeable lens according to claim 9, wherein said function of at least one of said focal position and said focal length is a power function.

11. The interchangeable lens according to claim 10, wherein said approximation information is made up of coefficients of respective terms of said power function.

12. The interchangeable lens according to claim 10, wherein said power function includes a term of raising to an inverse power of said focal position.

13. The interchangeable lens according to claim 10, wherein said power function includes a term of raising to an inverse power of said focal length.

14. The interchangeable lens according to claim 10, wherein said power function includes a term of a multiple root of said focal length.

15. A camera system comprising:
said interchangeable lens according to claim 9; and
a camera capable of reading said approximation information stored in said interchangeable lens in advance.

16. The camera system according to claim 15, wherein said camera comprises a unit which calculates distortion of an image taken by said optical system of said interchangeable lens based on a shooting condition of said optical system that was set when said image was taken and said read-out approximation information.

17. The camera system according to claim 16, wherein said camera comprises a unit which performs distortion correction on said image according to said calculated distortion.

18. The camera system according to claim 16, wherein said camera comprises a unit which adds information representing said calculated distortion to said image.

19. The camera system according to claim 15, wherein said camera comprises a unit which adds said read-out approximation information to an image taken by said optical system of said interchangeable lens.

20. A camera comprising an optical system including a processor that obtains approximation information when distortion aberration of said optical system is approximated by a continuous function with respect to a shooting condition that is set in said optical system is stored therein in advance, and when each of one or more coefficients of a function of a position in an imaging plane of said optical system that represents said distortion aberration is approximated by a function of at least one of a focal position and a focal length of said optical system,
said shooting condition being at least one of the focal position and the focal length of said optical system.

21. The camera according to claim 20, wherein said function of at least one of said focal position and said focal length is a power function.

22. The camera according to claim 21, wherein said approximation information is made up of coefficients of respective terms of said power function.

23. The camera according to claim 21, wherein said power function includes a term of raising to an inverse power of said focal position.

24. The camera according to claim 21, wherein said power function includes a term of raising to an inverse power of said focal length.

25. The camera according to claim 21, wherein said power function includes a term of a multiple root of said focal length.

26. A distortion correcting method for an image taken by an optical system, comprising the operations of:
preparing, in advance and by a processor, a first coefficient which represents distortion aberration of said optical system; and
calculating by a processor distortion of an image taken by said optical system based on said first coefficient prepared in advance and at least one of a focal position and a focal length that was read by an encoder from said optical system when said image was taken, wherein
said first coefficient is a coefficient of a first function which represents a relation between a second coefficient and at least one of the focal position and the focal length of said optical system; and
said second coefficient is a coefficient of a second function which represents a relation between the distortion aberration of said optical system and a position in an imaging plane of said optical system.

\* \* \* \* \*